(12) United States Patent
Kajio

(10) Patent No.: US 10,724,653 B2
(45) Date of Patent: Jul. 28, 2020

(54) FLUID CONTROL VALVE

(71) Applicant: AISIN SEIKI KABUSHIKI KAISHA, Kariya-shi, Aichi-ken (JP)

(72) Inventor: Katsuhiro Kajio, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 98 days.

(21) Appl. No.: 15/596,819

(22) Filed: May 16, 2017

(65) Prior Publication Data

US 2017/0335973 A1 Nov. 23, 2017

(30) Foreign Application Priority Data

May 17, 2016 (JP) .................................. 2016-098779

(51) Int. Cl.
*F16K 41/10* (2006.01)
*H01M 8/04082* (2016.01)
(Continued)

(52) U.S. Cl.
CPC ................ *F16K 41/10* (2013.01); *F16K 7/12* (2013.01); *H01M 8/04089* (2013.01);
(Continued)

(58) Field of Classification Search
CPC ............ F16K 41/10; F16K 41/12; F16K 7/12; H01M 8/04089; H01M 8/04201; H01M 2250/20; Y02T 90/32
(Continued)

(56) References Cited

U.S. PATENT DOCUMENTS 6,067,893 A * 5/2000 Drahusz, Jr. ................ F16J 3/02
                                                                  92/96
6,629,544 B2 * 10/2003 Nakajima .......... G05D 16/0663
                                                               137/505
(Continued)

FOREIGN PATENT DOCUMENTS

JP      2004270800 A     9/2004
JP      2009-146669 A    7/2009
(Continued)

OTHER PUBLICATIONS

JPO Office Action dated Mar. 3, 2020, in corresponding Japanese Patent Application No. 2016-098779 and English translation (8 pages).

*Primary Examiner* — Marina A Tietjen
(74) *Attorney, Agent, or Firm* — Buchanan Ingersoll & Rooney PC

(57) ABSTRACT

A fluid control valve includes: a valve housing including a flow path formed therein and having inflow and outflow ports for a fluid; a valve seat formed in the flow path; a driving device mounted in the valve housing; a valve shaft configured to be moved by being driven by the driving device; a valve body mounted on the valve shaft so as to open or close the flow path by being separated from or brought into contact with the valve seat; and a diaphragm formed in a form of an annular thin film and including outer and inner circumferential portions, and configured to move together with the valve shaft in a state where one side thereof faces a fluid chamber including the flow path and the valve seat so as to allow the fluid to flow therethrough, and the other side thereof faces an atmosphere chamber.

17 Claims, 11 Drawing Sheets

(51) Int. Cl.
*H01M 8/04089* (2016.01)
*F16K 7/12* (2006.01)

(52) U.S. Cl.
CPC .... *H01M 8/04201* (2013.01); *H01M 2250/20* (2013.01); *Y02T 90/32* (2013.01)

(58) Field of Classification Search
USPC .................................. 251/331; 92/98 R, 100
See application file for complete search history.

(56) References Cited

U.S. PATENT DOCUMENTS

| | | |
|---|---|---|
| 9,551,426 B2 | 1/2017 | Kiku |
| 2013/0092860 A1 | 4/2013 | Kiku et al. |

FOREIGN PATENT DOCUMENTS

| | | | |
|---|---|---|---|
| JP | 2010-053983 A | 3/2010 | |
| JP | 2012-099220 A | 5/2012 | |
| JP | 2012-225361 A | 11/2012 | |
| JP | 2013-087802 A | 5/2013 | |
| JP | 2013-087803 A | 5/2013 | |
| JP | 2015-014331 A | 1/2015 | |
| JP | 5849594 B2 | 1/2016 | |
| WO | WO-2016035412 A1 * | 3/2016 | ................. F16J 3/02 |

* cited by examiner

FLUID CONTROL VALVE

CROSS REFERENCE TO RELATED APPLICATIONS

This application is based on and claims priority under 35 U.S.C. § 119 to Japanese Patent Application 2016-098779, filed on May 17, 2016, the entire contents of which are incorporated herein by reference.

TECHNICAL FIELD

This disclosure relates to a fluid control valve which controls a flow of a fluid.

BACKGROUND DISCUSSION

As a type of fluid control valve, a fluid control valve disclosed in JP 2015-014331A (Reference 1) has been known. As illustrated in FIG. 2 of Reference 1, the fluid control valve (air pressure regulating valve 4) includes: a valve housing 41 formed with a flow path (including a pressure regulating valve inlet 411d, a pressure regulating valve outlet 411e, and a flow path R1) having an inflow port and an outflow port for a fluid; a valve seat (pressure regulating valve seat 411f) formed in the flow path; a driving device (motor assembly 42) mounted in the valve housing; a valve stem (valve shaft 44) moved by being operated by the driving device; a valve body (valve member 45) mounted on the valve stem and configured to open and close the flow path by being separated from or brought into contact with the valve seat; and a diaphragm 46 configured to be moved together with the valve body and having an outer circumferential portion sealably fixed to the valve housing, in which one side of the diaphragm faces a fluid chamber 414 that includes the flow path and the valve seat so as to allow the fluid to flow therein, and the other side of the diaphragm faces an atmosphere chamber (air chamber) 415 that inhibits the infiltration of a fluid thereinto and is opened to the atmosphere. An inner circumferential portion of the diaphragm (a circumferential edge of a mounting hole 461 of the diaphragm 46) is clamped in an up and down direction by a spring retainer 453 and a diaphragm holding body 455 which are fixed to a valve frame 451 mounted on the valve stem at a position spaced apart from an outer circumference of the valve stem outward in a radial direction of the valve stem, and the inner circumferential portion of the diaphragm is fixed between the spring retainer 453 and the diaphragm holding body 455 in a liquid-tight manner. In addition, a seal member (O-ring 454), which exhibits a sealing function and prevents moisture, a foreign matter, or the like, which has infiltrated into the fluid control valve, from infiltrating into the atmosphere chamber defined by the diaphragm, is provided between the valve frame 451 and the spring retainer 453.

However, in the aforementioned configuration, the inner circumferential portion of the diaphragm is clamped in the up and down direction by the spring retainer 453 and the diaphragm holding body 455 fixed to the valve frame 451 mounted on the valve stem at the position spaced apart from the outer circumference of the valve stem outward in the radial direction of the valve stem, and the inner circumferential portion of the diaphragm is fixed between the spring retainer 453 and the diaphragm holding body 455 in a liquid-tight manner, and as a result, the inner diameter of the diaphragm is inevitably increased, whereby the dimension of an outer diameter of the fluid control valve is enlarged. In addition, the dedicated seal member (O-ring 454), which prevents moisture, a foreign matter, or the like, which has infiltrated into the fluid chamber in the fluid control valve, from infiltrating into the atmosphere chamber defined by the diaphragm, needs to be provided separately from the diaphragm.

Thus, a need exists for a fluid control valve which is not susceptible to the drawback mentioned above.

SUMMARY

A fluid control valve according to an aspect of this disclosure includes: a valve housing including a flow path formed therein and having an inflow port and an outflow port for a fluid; a valve seat formed in the flow path; a driving device mounted in the valve housing; a valve shaft configured to be moved by being driven by the driving device; a valve body which is mounted on the valve shaft so as to open or close the flow path by being separated from or brought into contact with the valve seat; and a diaphragm formed in a form of an annular thin film and including an outer circumferential portion that is sealably fixed to the valve housing and an inner circumferential portion that is mounted on the valve shaft, the diaphragm being configured to move together with the valve shaft in a state where one side of the diaphragm faces a fluid chamber that is configured to include the flow path and the valve seat so as to allow the fluid to flow therethrough, and the other side of the diaphragm faces an atmosphere chamber that is opened to the atmosphere, in which the inner circumferential portion of the diaphragm includes a compressed portion, and a shaft seal portion configured to press an inner circumferential surface of the inner circumferential portion of the diaphragm against an outer circumferential surface of the valve shaft, and the fluid control valve further includes a compression mechanism part configured to generate shaft seal face pressure at the shaft seal portion by compressing the compressed portion of the diaphragm.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
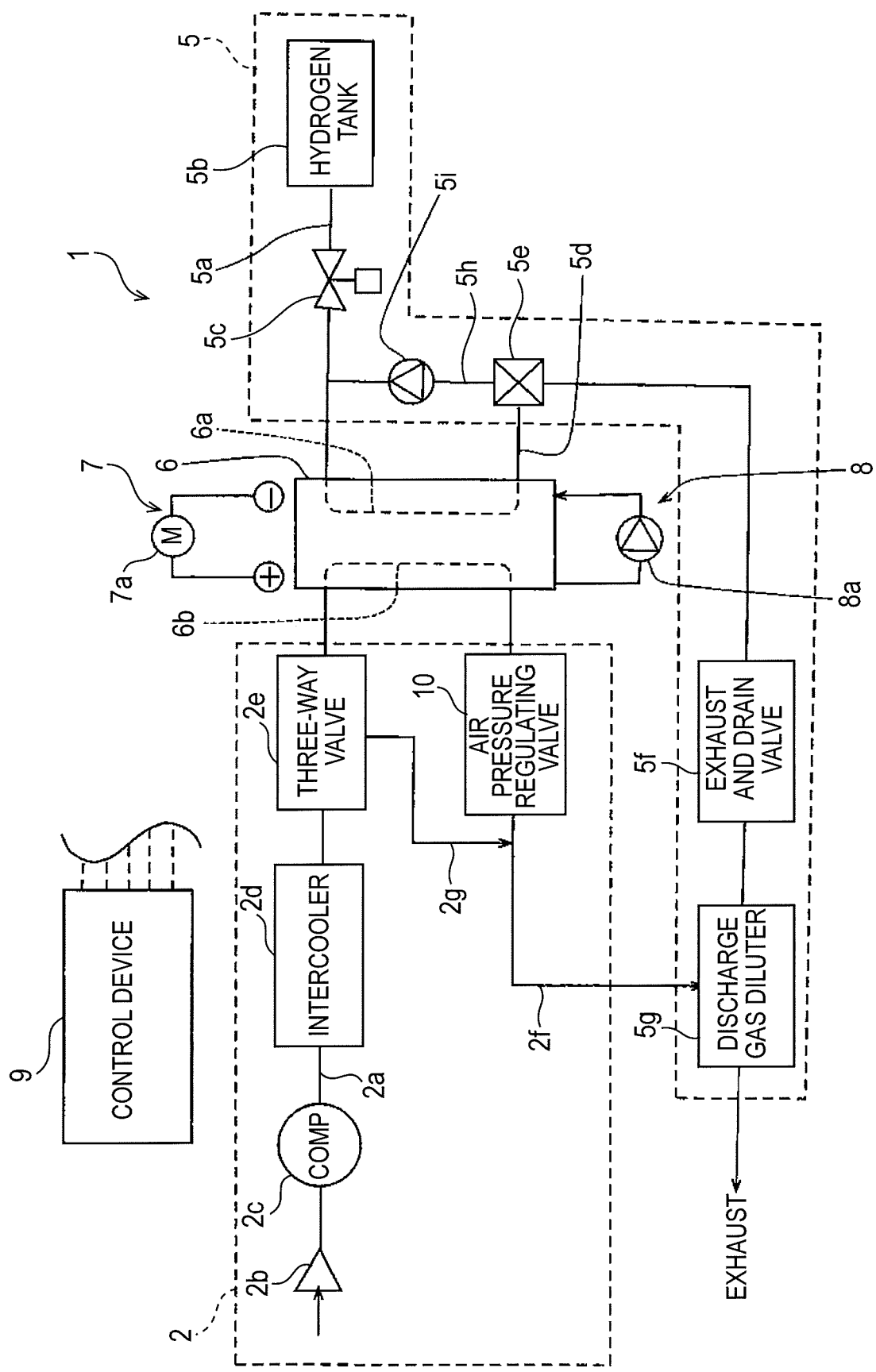
FIG. 1 is a block diagram illustrating a fuel cell system using an air pressure regulating valve disclosed here.

Hereinafter, an air pressure regulating valve 10 (which corresponds to a fluid control valve) according to a first exemplary embodiment disclosed here will be described with reference to FIGS. 1 to 4. As illustrated in FIG. 1, the air pressure regulating valve 10 according to the present exemplary embodiment is applied to an oxygen system 2 of a fuel cell system 1 mounted in a vehicle. However, the present invention is not limited thereto, and the air pressure regulating valve 10 may be widely used as a fluid control valve for a vehicle such as a fuel supply system or a hydraulic brake system, and may also be applied as a fluid control valve for household appliances or general industrial machinery.

Figure 2:
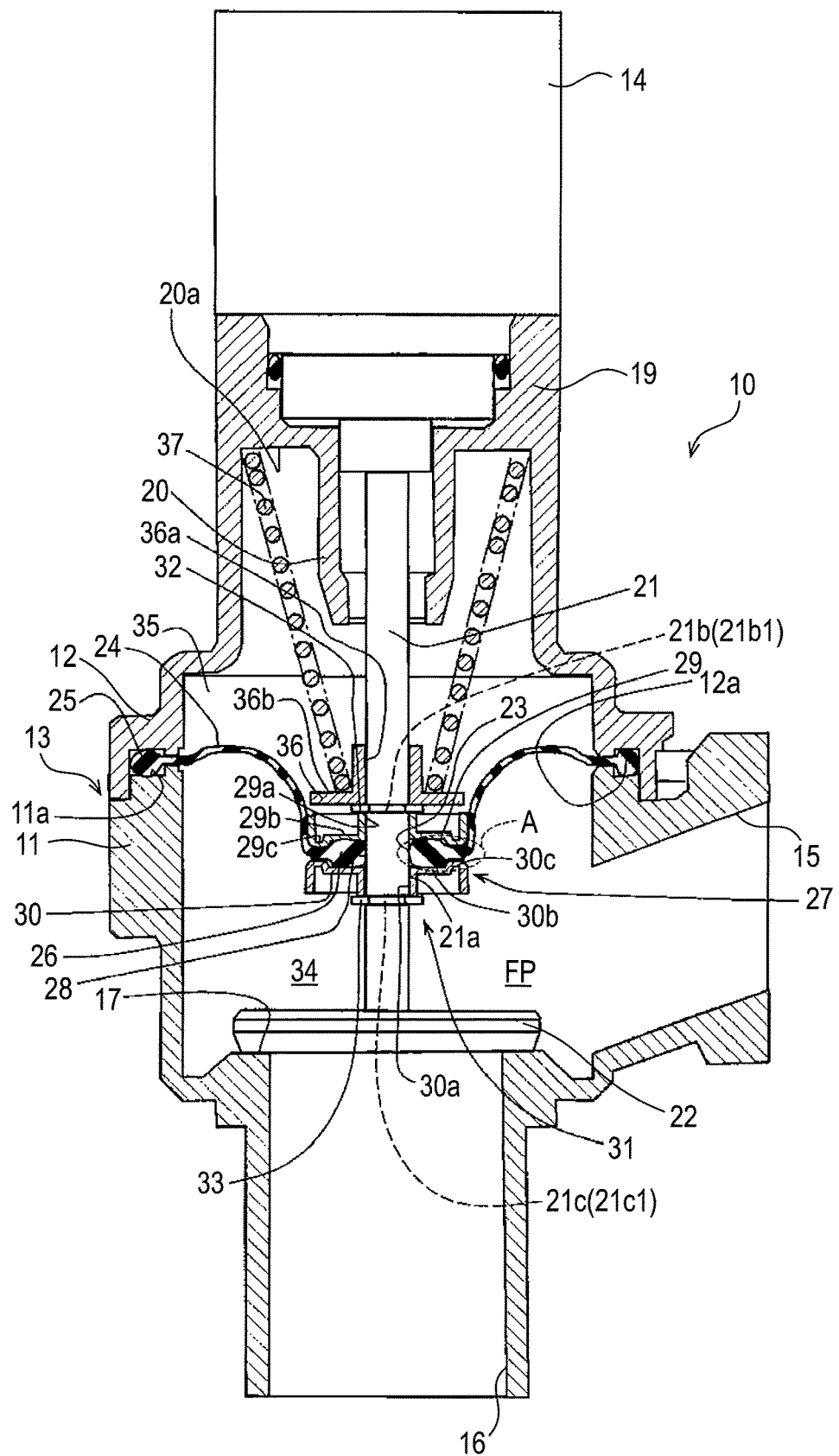
FIG. 2 is a partial cross-sectional view illustrating a first exemplary embodiment of the air pressure regulating valve illustrated in FIG. 1 when the air pressure regulating valve is closed.

Hereinafter, upper and lower sides in FIG. 2 are described as upper and lower sides of the air pressure regulating valve 10, respectively, and right and left sides in FIG. 2 are described as right and left sides of the air pressure regulating valve 10, respectively, but the upper, lower, right, and left sides are not relevant to a direction in which the air pressure regulating valve 10 is actually mounted in the vehicle.

As illustrated in FIG. 1, the fuel cell system 1 includes an oxygen system 2, a fuel system 5, a cell stack 6, a power system 7, a cooling system 8, and a control device 9.

The cell stack 6 is formed by, but not limited to, laminating plural solid polymer unit cells. The plural unit cells are electrically connected in series, and each of the unit cells includes an electrolyte membrane, and includes an anode electrode and a cathode electrode (not illustrated) with the electrolyte membrane interposed therebetween. In addition, an anode flow path 6a is formed in an anode separator (not illustrated) of the unit cell to supply hydrogen gas to the anode electrode, and a cathode flow path 6b is formed in a cathode separator (not illustrated) to supply air to the cathode electrode.

The oxygen system 2 is provided with an oxygen system supply pipe 2a, and the oxygen system supply pipe 2a is connected to one end of the cathode flow path 6b in the cell stack 6. An air filter 2b, an air compressor 2c, an intercooler 2d, and a three-way valve 2e are sequentially formed toward the cell stack 6 in the oxygen system supply pipe 2a.

One end of an oxygen system discharge pipe 2f is connected to the other end of the cathode flow path 6b, and the air pressure regulating valve 10, which is a 2-port fluid control valve, is provided in the oxygen system discharge pipe 2f. In addition, one end of a bypass pipe 2g is connected to the three-way valve 2e, and the other end of the bypass pipe 2g is connected to a portion (a side that is not connected to the cell stack 6) of the oxygen system discharge pipe 2f at a downstream side from the air pressure regulating valve 10.

Meanwhile, in the fuel system 5, a hydrogen tank 5b is connected to one end of a fuel system supply pipe 5a, and a shut-off valve 5c is formed in the fuel system supply pipe 5a. The other end of the fuel system supply pipe 5a is connected to one end of the anode flow path 6a in the cell stack 6. A fuel system discharge pipe 5d is connected to the other end of the anode flow path 6a, and a gas-liquid separator 5e, an exhaust and drain valve 5f, and a discharge gas diluter 5g are formed sequentially from a side close to the cell stack 6 in the fuel system discharge pipe 5d. The other end of the oxygen system discharge pipe 2f is connected to the discharge gas diluter 5g.

The gas-liquid separator 5e is connected to a portion between connecting portions with the shut-off valve 5c in the fuel system supply pipe 5a and the anode flow path 6a through a fuel system circulation path 5h. A circulation pump 5i is formed in the fuel system circulation path 5h, and hydrogen gas is circulated from the gas-liquid separator 5e toward the anode flow path 6a.

The power system 7 is provided with an electric motor 7a configured to drive the vehicle. The electric motor 7a is connected to a positive electrode and a negative electrode of the cell stack 6, and operated by power generated by the cell stack 6.

The cooling system 8 is provided to a water cooling pump 8a so as to cool the cell stack 6 by circulating a coolant in the cell stack 6.

The control device 9 is electrically connected to the air compressor 2c, the three-way valve 2e, the air pressure regulating valve 10, the shut-off valve 5c, the circulation pump 5i, and the water cooling pump 8a. The control device 9 controls the operations of the respective constituent elements based on a required power generation amount of the cell stack 6 calculated in accordance with a traveling state of the vehicle.

With the aforementioned configuration, when the operation of the vehicle is initiated, the control device 9 supplies air to the cathode flow path 6b by operating the air compressor 2c, and supplies hydrogen gas to the anode flow path 6a by operating the shut-off valve 5c and the circulation pump 5i such that power generation is performed in the cell stack 6.

In the oxygen system 2, air including oxygen sucked through the air filter 2b is compressed by the air compressor 2c, and then cooled by the intercooler 2d. The three-way valve 2e controls the flow rate of air flowing toward the cell stack 6 by displacing a position of a valve member in accordance with a power generation amount of the cell stack 6, separating air supplied from the intercooler 2d, and releasing the air to the bypass pipe 2g.

In addition, the air pressure regulating valve 10 adjusts a discharge amount of air supplied into the cell stack 6 by adjusting an opening degree thereof, thereby controlling pressure in the cell stack 6.

Hydrogen-off gas (fuel gas-off gas) discharged from the anode flow path 6a includes unnecessary gas such as nitrogen transmitted from the cathode side, and water (water vapor) produced by power generation. The gas-liquid separator 5e serves to separate hydrogen gas and water. The hydrogen gas separated by the gas-liquid separator 5e is supplied and circulated into the fuel system supply pipe 5a through the fuel system circulation path 5h by the circulation pump 5i. The water (liquid phase) separated by the gas-liquid separator 5e is sent to the discharge gas diluter 5g together with the hydrogen gas when the exhaust and drain valve 5f is opened. The hydrogen gas, which is discharged from the gas-liquid separator 5e to the discharge gas diluter 5g, is diluted by the discharge gas diluter 5g with the air supplied from the oxygen system discharge pipe 2f, and then discharged to the outside together with the water.

First Exemplary Embodiment

Next, a structure of a first exemplary embodiment of the air pressure regulating valve 10 will be described in detail. As illustrated in FIG. 2, the air pressure regulating valve 10 is configured such that a motor assembly 14 (which corresponds to a driving device) is mounted on a valve housing 13 formed by coupling a valve cover 12 and a valve body 11 which are mounted in the vehicle. In addition, in the first exemplary embodiment, the motor assembly 14, which uses an electric motor as a driving device, is used, but a solenoid actuator, or an actuator, which is operated by a gas pressure, may be used.

A pressure regulating valve inlet 15 (which corresponds to an inflow port), which is opened at a right side in FIG. 2, is formed in the valve body 11. The pressure regulating valve inlet 15 is connected to the other end of the cathode flow path 6b of the cell stack 6 through the oxygen system discharge pipe 2f (see FIG. 1). In addition, a pressure regulating valve outlet 16 (which corresponds to an outflow port), which is opened in a direction perpendicular to the pressure regulating valve inlet 15 (opened downward in FIG. 2), is formed in the valve body 11. The pressure regulating valve outlet 16 is connected to the discharge gas diluter 5g through the oxygen system discharge pipe 2f. The air pressure regulating valve 10 has the valve housing 13 formed with a flow path FP that reaches the pressure regulating valve outlet 16 from the pressure regulating valve inlet 15.

A pressure regulating valve seat 17 (which corresponds to a valve seat) is formed on an inner circumferential surface of the valve body 11 between the pressure regulating valve inlet 15 and the pressure regulating valve outlet 16. The pressure regulating valve seat 17 is formed in a flat annular shape.

The valve cover 12 is formed by a mounting surface 12a which is mounted on the valve body 11, a motor mounting portion 19 which protrudes upward from the mounting surface 12a, and a shaft accommodating portion 20 which extends downward in a step shape at a central portion of the motor mounting portion 19 and is opened at a lower end of the shaft accommodating portion 20. A valve shaft 21 (which corresponds to a valve stem) is accommodated in the shaft accommodating portion 20. The valve shaft 21 is moved by being operated by the motor assembly 14. For example, when a stepping motor (not illustrated) of the motor assembly 14 is rotated in one direction, the valve shaft 21 is moved downward in the valve housing 13 in an axial direction, and when the stepping motor is rotated in the reverse direction, the valve shaft 21 is moved upward.

A valve body 22, which comes into contact with the pressure regulating valve seat 17, is provided at a lower end of the valve shaft 21 such that as the valve body 22 is separated from or brought into contact with the pressure regulating valve seat 17, the flow path FP is opened or closed. Further, when the fuel cell system 1 stops power generation, negative pressure (pressure lower than atmospheric pressure) is formed in the flow path FP at the pressure regulating valve inlet 15 of the air pressure regulating valve 10 by a reaction between hydrogen gas and oxygen remaining in the cell stack 6 or condensation of remaining water vapor caused by a decrease in temperature of the cell stack 6.

As illustrated in FIG. 2, a diaphragm 24, which is formed in the form of an annular thin film and has a mounting hole 23, which penetrates front and rear surfaces, at an approximately central portion of the diaphragm 24, includes an outer circumferential portion 25 having a flange-shaped bead portion, which expands outward, in which the outer circumferential portion 25 is fixed in a gas-tight and liquid-tight manner by being clamped between the upper end surface 11a of the valve body 11 and the mounting surface 12a of the valve cover 12 which is mounted on the valve body 11.

A flange-shaped bead portion 26, which expands inward, is formed around the mounting hole 23, that is, over the entire inner circumferential portion of the diaphragm 24. As illustrated in FIG. 2, the bead portion 26, which is the inner circumferential portion of the diaphragm 24, is compressed by a compression mechanism part 27 in an up and down direction, that is, in a thickness direction of the diaphragm 24. The compression in the thickness direction of the diaphragm 24 by the compression mechanism part 27 (indicated by white arrows in the up and down directions in FIG. 3) elastically deforms the bead portion 26, and generates shaft seal face pressure in a shaft seal portion 28 in which an inner circumferential surface 26a of the bead portion 26 is pressed (indicated by a white arrow in a left direction in FIG. 3) against the outer circumferential surface 21a of the valve shaft 21, as illustrated in FIG. 3.

Figure 3:
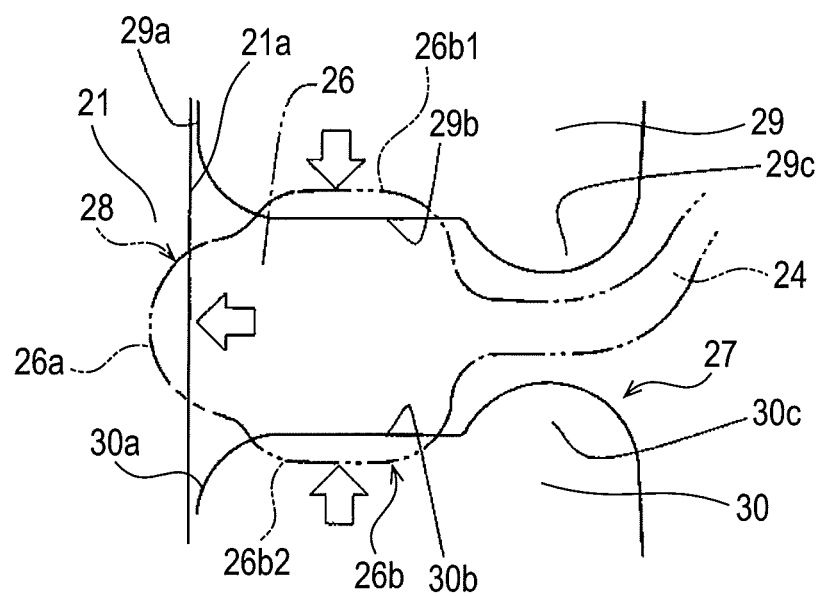
FIG. 3 is an enlarged view of part A in FIG. 2, which illustrates a first exemplary embodiment of a compression mechanism part, for explaining a shaft seal portion of a diaphragm.

As illustrated in FIG. 3, the cross-sectional shape of the shaft seal portion 28 is formed, for example, in an arc shape. Further, the cross-sectional shape of the shaft seal portion 28 may be formed to have plural (two or more) arcs instead of the single arc as illustrated in FIG. 3, and the inner circumferential surfaces 26a positioned at tip ends of the plural arcs may be pressed against the outer circumferential surface 21a of the valve shaft 21 such that the number of seal points with the valve shaft 21 by the diaphragm 24 may be increased.

As illustrated in FIG. 3, the bead portion 26 is formed such that the cross-sectional shape of the bead portion 26 has a flat shape in which a length of the bead portion 26 in a horizontal direction of the diaphragm 24 (left and right direction in FIG. 3) is longer than a length in the thickness direction of the diaphragm 24 (up and down direction in FIG. 3), and as a result, a seating state is stabilized, and the bead portion 26 may be prevented from being inclined by being compressed by the compression mechanism part 27. As illustrated in FIG. 3, the cross section of a compressed portion 26b of the bead portion 26, which is compressed by the compression mechanism part 27, is formed such that a first surface 26b1, which is the upper surface of the bead portion, and a second surface 26b2, which is the lower surface of the bead portion, are in parallel with the horizontal direction, that is, the radial direction of the diaphragm 24 (left and right direction in FIG. 3).

The compression mechanism part 27 includes a pair of clamping members which is provided at opposite sides in the thickness direction of the diaphragm 24 so as to compress an inner circumferential portion 26 of the diaphragm 24. Specifically, as illustrated in FIGS. 2 and 3, the pair of clamping members includes a first clamping member 29 which is provided at the upper side of the diaphragm 24, and a second clamping member 30 which is provided at the lower side of the diaphragm 24.

As illustrated in FIG. 3, the first clamping member 29 is provided with a through hole 29a which is formed at an inner side in the radial direction and into which the valve shaft 21 is inserted, a compressing portion 29b which extends in the radial direction and compresses the compressed portion 26b of the bead portion 26, and a disengagement preventing portion 29c which is provided in a convex shape at an outer side in the radial direction from the compressing portion 29b and prevents the disengagement of the bead portion 26 from the first clamping member 29.

Similarly, as illustrated in FIG. 3, the second clamping member 30 is also provided with a through hole 30a which is formed at the inner side in the radial direction and into which the valve shaft 21 is inserted, a compressing portion 30b which extends in the radial direction and compresses the compressed portion 26b of the bead portion 26, and a disengagement preventing portion 30c which is provided in a convex shape at the outer side in the radial direction from the compressing portion 30b and prevents the disengagement of the bead portion 26 from the second clamping member 30.

Both the compressing portion 29b of the first clamping member 29 and the compressing portion 30b of the second clamping member 30 are formed to be in parallel with the horizontal direction, that is, the radial direction of the diaphragm 24 (left and right direction in FIG. 3).

A shaft seal face pressure setting part 31, which sets shaft seal face pressure of the shaft seal portion 28, which is applied to the first clamping member 29 and the second clamping member 30, to predetermined setting pressure, is a setting mechanism which sets a relative distance between the first clamping member 29 and the second clamping member 30 for compressing the compressed portion 26b of the bead portion 26 corresponding to generation of the setting pressure of the shaft seal face pressure.

In the first exemplary embodiment, the shaft seal face pressure setting part 31 includes a pair of positioning portions 21b and 21c provided at the opposite sides of the valve shaft 21 in the thickness direction of the diaphragm 24. Specifically, as illustrated in FIG. 2, the pair of positioning portions 21b and 21c includes a ring groove 21b1 which is formed as the positioning portion 21b of the first clamping member 29, and a ring groove 21c1 which is formed as the positioning portion 21c of the second clamping member 30.

An E-ring 32, which is a locking member that locks the first clamping member 29 on the valve shaft 21, is mounted in the ring groove 21b1 provided on the valve shaft 21. An E-ring 33, which is a locking member that locks the second clamping member 30 on the valve shaft 21, is mounted in the ring groove 21c1 provided on the valve shaft 21.

Therefore, the setting pressure of the shaft seal face pressure of the shaft seal portion 28 may be set by the pair of positioning portions 21b and 21c which sets a relative distance between the first clamping member 29 and the second clamping member 30 which compresses the bead portion 26. The axial movements of the first clamping member 29 and the second clamping member 30 with respect to the valve shaft 21 are restricted by the E-ring 32 and the E-ring 33 which are the locking members mounted in the pair of positioning portions 21b and 21c, and as a result, a relative distance between the first clamping member 29 and the second clamping member 30 is maintained.

The diaphragm 24 is moved together with the valve shaft 21. An inner side in the radial direction of the diaphragm 24 is mounted on the outer circumferential surface 21a of the valve shaft 21 by the shaft seal portion 28 in a gas-tight and liquid-tight manner, and an outer side in the radial direction thereof is mounted on an inner circumferential surface of the valve housing 13 in a gas-tight and liquid-tight manner, and as a result, the interior of the valve housing 13 is divided into two spaces. That is, one side of the diaphragm 24 faces a fluid chamber 34 which is configured to include the flow path FP and the pressure regulating valve seat 17 so as to allow a fluid (gas) to flow therein, and the other side of the diaphragm 24 faces an atmosphere chamber 35 which is opened to the atmosphere. The atmosphere chamber 35 communicates with outside air through a vent hole (not illustrated) provided in the valve cover 12.

By the shaft seal portion 28 of the diaphragm 24, a fluid, which flows in the fluid chamber 34 in the air pressure regulating valve 10, and moisture, a foreign matter, or the like, which has infiltrated into the fluid chamber 34, are prevented from infiltrating into the atmosphere chamber 35.

As illustrated in FIG. 2, a coil spring 37, which surrounds the valve shaft 21 in a circumferential direction, is interposed between a stepped portion 20a of the shaft accommodating portion 20 of the valve cover 12 and a shoulder portion 36b of a spring retainer 36 having a through hole 36a into which the valve shaft 21 inserted. The coil spring 37 is elastically mounted between the spring retainer 36 and the valve cover 12 and biases the valve shaft 21 in a direction toward the pressure regulating valve seat 17. The spring retainer 36 is pressed against the E-ring 32 mounted in the ring groove 21b1 by being biased by the coil spring 37 such that a displacement in the axial direction with respect to the valve shaft 21 is restricted.

Figure 4:
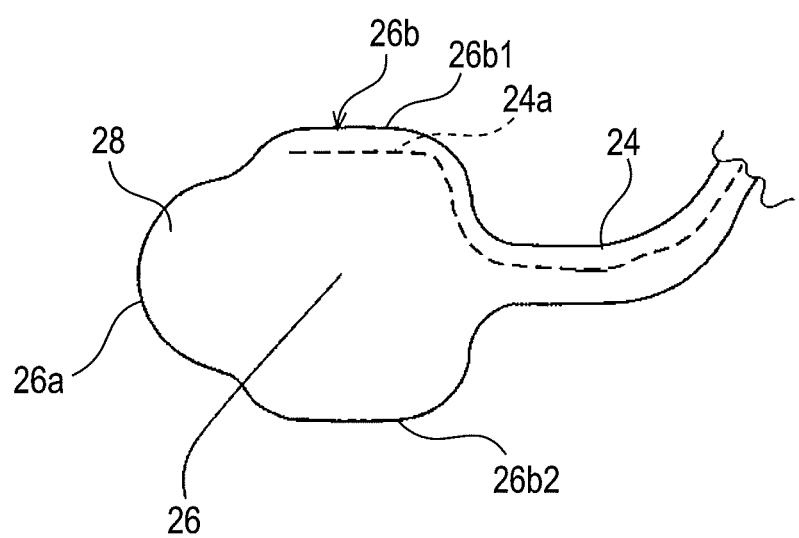
FIG. 4 is an explanatory view illustrating a first exemplary embodiment of a bead portion of the diaphragm.

As illustrated in FIG. 4, the diaphragm 24 is configured, for example, by inserting a base fabric material 24a having a reinforcing function such as nylon, polyester, or aramid fiber into an elastic material having a sealing function such as, for example, a synthetic rubber material in order to improve strength.

As illustrated in FIG. 4, in order to prevent the sealing function of the diaphragm 24 from being damaged, the base fabric material 24a extends to the compressed portion 26b in an inner circumferential direction from the outer circumferential portion 25 of the diaphragm 24 so that the base fabric material 24a does not extend to the shaft seal portion 28 of the diaphragm 24. In addition, even in the case of the valve shaft 21, in order to ensure the sealing function of the diaphragm 24, high-precision processing by required polishing and finishing is performed on a portion in an area of the outer circumferential surface 21a against which the inner circumferential surface 26a of the bead portion 26, which is the shaft seal portion 28, is pressed.

As illustrated in FIG. 4, the base fabric material 24a is disposed on a front layer of the other side of the diaphragm 24 (upper side in FIG. 4), which faces the atmosphere chamber 35, rather than on the one side of the diaphragm 24 (lower side in FIG. 4) which faces the fluid chamber 34.

Therefore, the base fabric material 24a may be prevented from deteriorating by absorbing moisture in the fluid chamber 34.

Next, the mounting of the diaphragm 24, the first and second clamping members 29 and 30, which constitute the compression mechanism part 27, the coil spring 37, and the valve body 22 to the valve shaft 21 of the air pressure regulating valve 10 according to the first exemplary embodiment will be described with reference to FIG. 2.

The other end of the coil spring 37, the one end of which is locked on the stepped portion 20a of the valve cover 12, is locked on the shoulder portion 36b of the spring retainer 36 in which the through hole 36a is penetrated by the valve shaft 21. Next, the spring retainer 36 is pushed forward on the valve shaft 21 against the biasing of the coil spring 37. In a state in which the spring retainer 36 passes over the ring groove 21c1 provided on the valve shaft 21 and passes over the ring groove 21b1, the E-ring 32 is mounted in the ring groove 21b1 such that the displacement of the spring retainer 36 with respect to the valve shaft 21 is restricted by the E-ring 32.

Next, the valve shaft 21 sequentially passes through the through hole 29a of the first clamping member 29, the mounting hole 23 of the diaphragm 24, and the through hole 30a of the second clamping member 30, and the first clamping member 29, the diaphragm 24, and the second clamping member 30 are pushed forward toward the E-ring 32. Subsequently, the first clamping member 29 comes into contact with the E-ring 32 such that the displacement of the first clamping member 29 with respect to the valve shaft 21 is restricted, and the second clamping member 30 is pushed forward toward the E-ring 32 such that the bead portion 26 of the diaphragm 24 is compressed by the first clamping member 29 and the second clamping member 30.

Subsequently, in a state in which the bead portion 26 is compressed and the second clamping member 30 passes over the ring groove 21c1 provided on the valve shaft 21, the E-ring 33 is mounted in the ring groove 21c1 such that the displacement of the second clamping member 30 with respect to the valve shaft 21 is restricted by the E-ring 33. Further, the valve body 22 is mounted on the valve shaft 21.

In this way, the diaphragm 24, the first and second clamping members 29 and 30, which constitute the compression mechanism part 27, the coil spring 37, and the valve body 22 are mounted on the valve shaft 21 of the air pressure regulating valve 10 such that the shaft seal face pressure of the shaft seal portion 28 may be set to the predetermined setting pressure.

Next, an operation of the air pressure regulating valve 10 will be described. When the valve shaft 21 is positioned at the upper side and the valve body 22 is separated from the pressure regulating valve seat 17, the air pressure regulating valve 10 is in the opened state (not illustrated). In this state, the pressure regulating valve inlet 15 and the pressure regulating valve outlet 16 communicate with each other, and a flow of a fluid such as air between the pressure regulating valve inlet 15 and the pressure regulating valve outlet 16 is allowed.

When the stepping motor of the motor assembly 14 is rotated in one direction by a driving signal from the control device 9, the valve body 22 is moved downward in the axial direction together with the valve shaft 21, and the valve body 22 is seated on (brought into contact with) the pressure regulating valve seat 17 (see FIG. 2). Therefore, the air pressure regulating valve 10 is closed, and the communication between the pressure regulating valve inlet 15 and the pressure regulating valve outlet 16 is blocked such that the flow of the fluid (gas) between the pressure regulating valve inlet 15 and the pressure regulating valve outlet 16 is blocked. That is, in the air pressure regulating valve 10, the motor assembly 14 is positioned and fixed at the closed position such that the valve body 22 comes into contact with the pressure regulating valve seat 17, and the closed state of the flow path FP of the valve housing 13 is maintained.

Second Exemplary Embodiment

Figure 5:
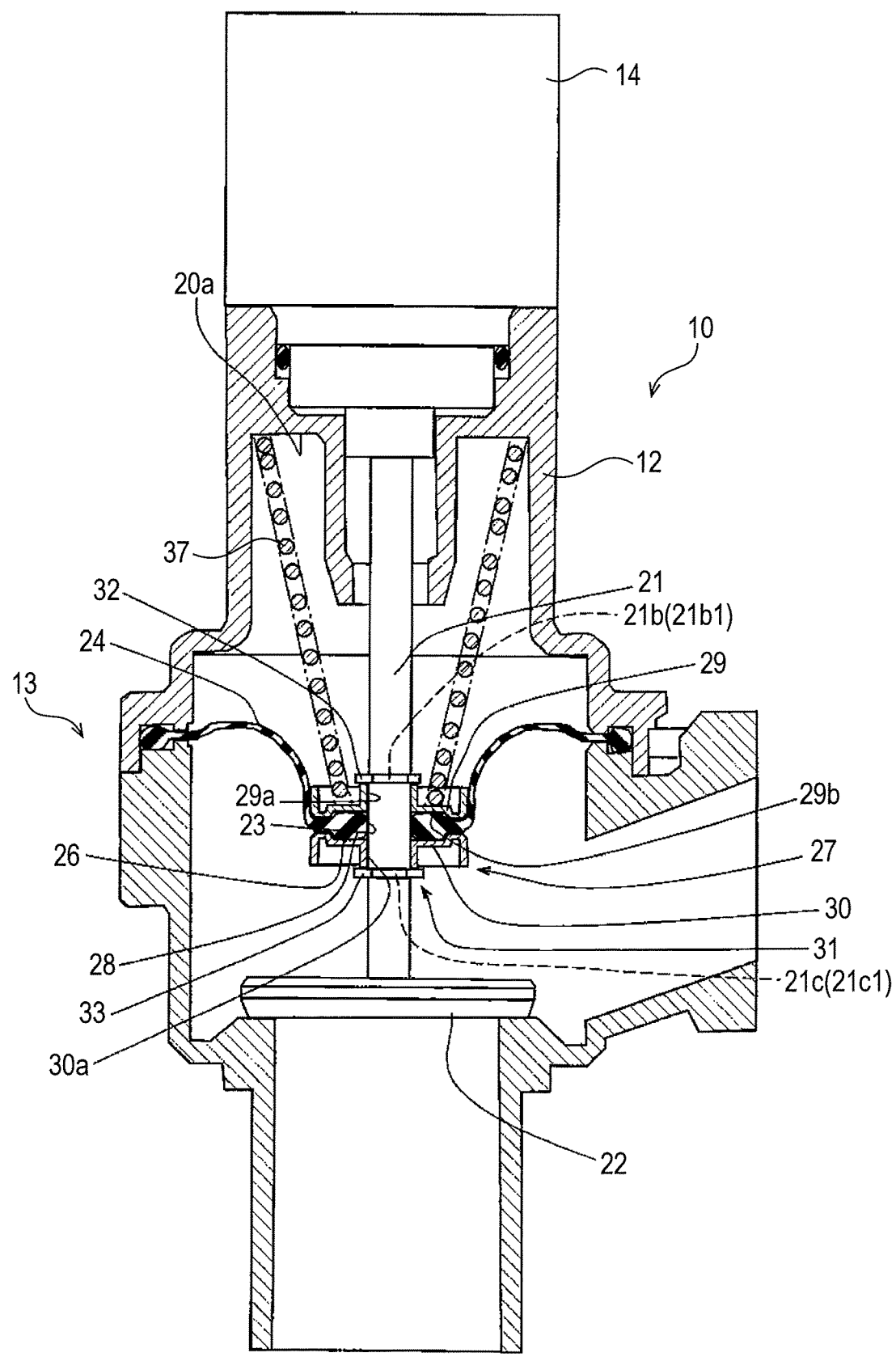
FIG. 5 is a partial cross-sectional view illustrating an air pressure regulating valve according to a second exemplary embodiment disclosed here in the closed state.

Next, a second exemplary embodiment of the air pressure regulating valve 10 will be described. In the air pressure regulating valve 10 according to the first exemplary embodiment, as illustrated in FIG. 2, the coil spring 37, which biases the valve shaft 21 in the direction toward the pressure regulating valve seat 17, is configured to be interposed between the valve cover 12 and the spring retainer 36. Instead, as illustrated in FIG. 5, the air pressure regulating valve 10 of the second exemplary embodiment differs from the air pressure regulating valve 10 of the first exemplary embodiment only in that the coil spring 37 is interposed between the valve cover 12 and the first clamping member 29. Further, the coil spring 37 is locked on the first clamping member 29 at a back side of the compressing portion 29b.

In the air pressure regulating valve 10 of the second exemplary embodiment, similar to the first exemplary embodiment, regarding the shaft seal face pressure of the shaft seal portion 28, the shaft seal face pressure of the shaft seal portion 28 may be set to setting pressure by a relative distance between the first clamping member 29 and the second clamping member 30. Therefore, the spring retainer 36 may be removed from the air pressure regulating valve 10 of the second exemplary embodiment, and as a result, the number of components is reduced in comparison with the air pressure regulating valve 10 of the first exemplary embodiment.

Next, the mounting of the diaphragm 24, the first and second clamping members 29 and 30, which constitute the compression mechanism part 27, the coil spring 37, and the valve body 22 to the valve shaft 21 of the air pressure regulating valve 10 according to the second exemplary embodiment will be described with reference to FIG. 5.

The E-ring 32 is mounted in the ring groove 21b1 provided on the valve shaft 21. The other side of the coil spring 37, the one end of which is locked on the stepped portion 20a of the valve cover 12 is locked at a back side of the compressing portion 29b of the first clamping member 29, in which the through hole 29a is penetrated by the valve shaft 21. Subsequently, the valve shaft 21 sequentially passes through the mounting hole 23 of the diaphragm 24 and the through hole 30a of the second clamping member 30, and the first clamping member 29, the diaphragm 24, and the second clamping member 30 are pushed forward on the valve shaft 21 toward the E-ring 32 against the biasing of the coil spring 37.

Subsequently, the first clamping member 29 comes into contact with the E-ring 32 such that the displacement of the first clamping member 29 with respect to the valve shaft 21 is restricted, and the second clamping member 30 is pushed forward toward the E-ring 32 such that the bead portion 26 of the diaphragm 24 is compressed by the first clamping member 29 and the second clamping member 30. Subsequently, in a state in which the bead portion 26 is compressed and the second clamping member 30 passes over the ring groove 21c1 provided on the valve shaft 21, the E-ring 33 is mounted in the ring groove 21c1 such that the displacement of the second clamping member 30 with respect to the valve shaft 21 is restricted by the E-ring 33. Further, the valve body 22 is mounted on the valve shaft 21.

In this way, the diaphragm 24, the first and second clamping members 29 and 30, which constitute the compression mechanism part 27, the coil spring 37, and the valve body 22 are mounted on the valve shaft 21 of the air pressure regulating valve 10 such that the shaft seal face pressure of the shaft seal portion 28 may be set to predetermined setting pressure.

Third Exemplary Embodiment

Figure 6:
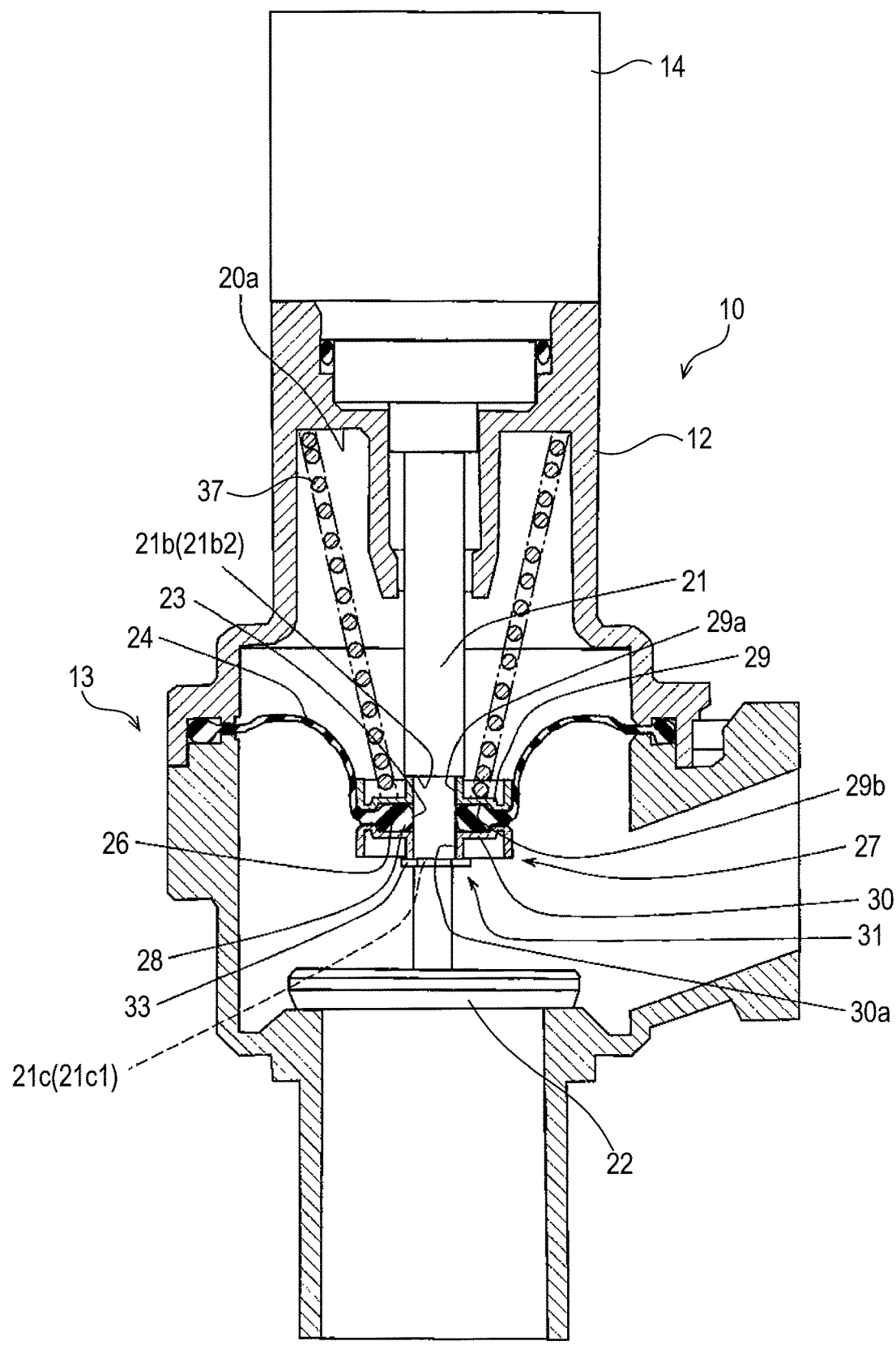
FIG. 6 is a partial cross-sectional view illustrating an air pressure regulating valve according to a third exemplary embodiment disclosed here in the closed state.

Next, a third exemplary embodiment of the air pressure regulating valve 10 will be described. In the air pressure regulating valve 10 of the second exemplary embodiment, as illustrated in FIG. 5, the Bring 32, which is a locking member, is mounted in the ring groove 21$b$1 which is formed as the positioning portion 21$b$ of the first clamping member 29. The air pressure regulating valve 10 of the third exemplary embodiment differs from the air pressure regulating valve 10 of the second exemplary embodiment only in that a stepped portion 21$b$2 as the positioning portion 21$b$ of the first clamping member 29 is formed on the valve shaft 21, as illustrated in FIG. 6, instead of the ring groove 21$b$1 and the E-ring 32 according to the second exemplary embodiment, and the diameter of the upper portion of the stepped portion 21$b$2 of the valve shaft 21 is greater than the diameter of the lower portion of the stepped portion 21$b$2 and the diameter of the through hole 29$a$ of the first clamping member 29.

Therefore, the stepped portion 21$b$2 may serve not only as the positioning portion 21$b$ of the first clamping member 29, but also as a locking member which restricts the axial movement of the first clamping member 29 with respect to the valve shaft 21, that is, locks the first clamping member 29 on the valve shaft 21.

In the air pressure regulating valve 10 of the third exemplary embodiment, similar to the second exemplary embodiment, regarding the shaft seal face pressure of the shaft seal portion 28, the shaft seal face pressure of the shaft seal portion 28 may be set to setting pressure by a relative distance between the first clamping member 29 and the second clamping member 30. Therefore, the E-ring 32 may be removed from the air pressure regulating valve 10 of the third exemplary embodiment, and as a result, the number of components is reduced in comparison with the air pressure regulating valve 10 of the second exemplary embodiment.

Next, the mounting of the diaphragm 24, the first and second clamping members 29 and 30, which constitute the compression mechanism part 27, the coil spring 37, and the valve body 22 to the valve shaft 21 of the air pressure regulating valve 10 according to the third exemplary embodiment will be described with reference to FIG. 6.

The other end of the coil spring 37, one end of which one end is locked on the stepped portion 20$a$ of the valve cover 12, is locked at a back side of the compressing portion 29$b$ of the first clamping member 29 in which the through hole 29$a$ is penetrated by the valve shaft 21. Subsequently, the valve shaft 21 sequentially passes through the mounting hole 23 of the diaphragm 24 and the through hole 30$a$ of the second clamping member 30, and the first clamping member 29, the diaphragm 24, and the second clamping member 30 are pushed forward on the valve shaft 21 toward the stepped portion 21$b$2 provided on the valve shaft 21 against the biasing of the coil spring 37.

Subsequently, the first clamping member 29 comes into contact with the stepped portion 21$b$2 such that the displacement of the first clamping member 29 with respect to the valve shaft 21 is restricted, and the second clamping member 30 is pushed forward toward the stepped portion 21$b$2 such that the bead portion 26 of the diaphragm 24 is compressed by the first clamping member 29 and the second clamping member 30. Subsequently, in a state in which the bead portion 26 is compressed and the second clamping member 30 passes over the ring groove 21$c$1 provided on the valve shaft 21, the E-ring 33 is mounted in the ring groove 21$c$1 such that the displacement of the second clamping member 30 with respect to the valve shaft 21 is restricted by the E-ring 33. Further, the valve body 22 is mounted on the valve shaft 21.

In this way, the diaphragm 24, the first and second clamping members 29 and 30, which constitute the compression mechanism part 27, the coil spring 37, and the valve body 22 are mounted on the valve shaft 21 of the air pressure regulating valve 10 such that the shaft seal face pressure of the shaft seal portion 28 may be set to predetermined setting pressure.

Fourth Exemplary Embodiment

Figure 7:
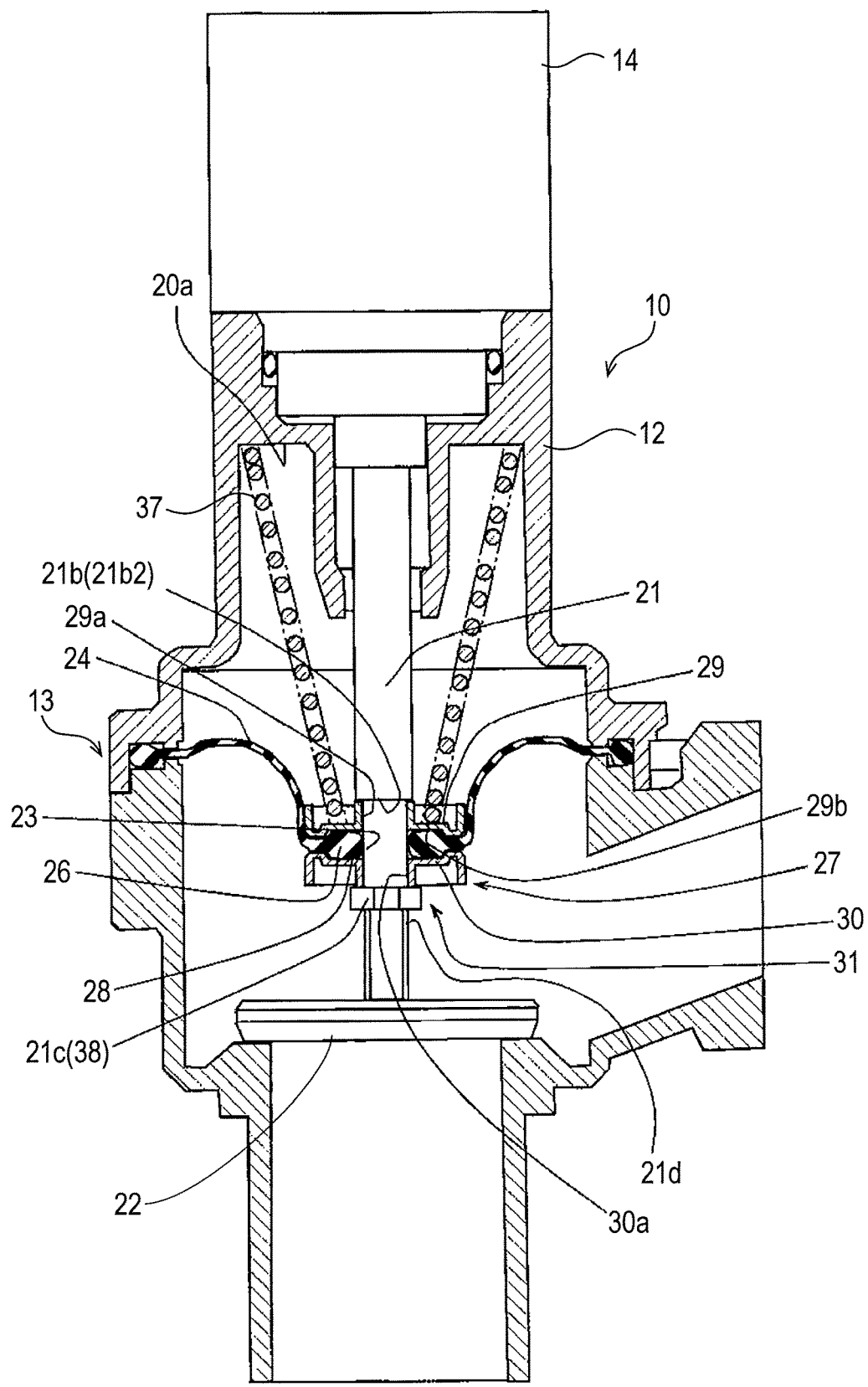
FIG. 7 is a partial cross-sectional view illustrating an air pressure regulating valve according to a fourth exemplary embodiment disclosed here in the closed state.

Next, a fourth exemplary embodiment of the air pressure regulating valve 10 will be described. In the air pressure regulating valve 10 of the third exemplary embodiment, as illustrated in FIG. 6, there are provided the ring groove 21$c$1 which is formed as the positioning portion 21$c$ of the second clamping member 30, and the E-ring 33 which is mounted in the ring groove 21$c$1. The air pressure regulating valve 10 of the fourth exemplary embodiment differs from the air pressure regulating valve 10 of the third exemplary embodiment only in that instead of the ring groove 21$c$1 and the E-ring 33 of the third exemplary embodiment, an external thread 21$d$ is formed on the lower portion of the valve shaft 21, as illustrated in FIG. 7, and an adjusting nut 38, which is thread-coupled to the external thread 21$d$, so that the position of the second clamping member 30 with respect to the valve shaft 21 is maintained by changing the thread-coupled position, is configured as the positioning portion 21$c$ of the second clamping member 30.

Therefore, the adjusting nut 38 may serve not only as the positioning portion 21$c$ of the second clamping member 30, but also as a locking member which restricts the axial movement of the second clamping member 30 with respect to the valve shaft 21, that is, locks the second clamping member 30 on the valve shaft 21.

In the air pressure regulating valve 10 of the fourth exemplary embodiment, similar to the third exemplary embodiment, regarding the shaft seal face pressure of the shaft seal portion 28, the shaft seal face pressure of the shaft seal portion 28 may be set to setting pressure by a relative distance between the first clamping member 29 and the second clamping member 30. Therefore, in the air pressure regulating valve 10 of the fourth exemplary embodiment, since a relative distance between the first clamping member 29 and the second clamping member 30 may be changed by changing the thread-coupled position of the adjusting nut 38 with respect to the external thread 21$d$, the setting pressure of the shaft seal face pressure of the shaft seal portion 28 may be easily changed without changing components, in comparison with the air pressure regulating valve 10 of the third exemplary embodiment.

Next, the mounting of the diaphragm 24, the first and second clamping members 29 and 30, which constitute the compression mechanism part 27, the coil spring 37, and the valve body 22 to the valve shaft 21 of the air pressure regulating valve 10 according to the fourth exemplary embodiment will be described with reference to FIG. 7.

The other end of the coil spring 37, the one of which is locked on the stepped portion 20a of the valve cover 12, is locked at a back side of the compressing portion 29b of the first clamping member 29 of which the through hole 29a is penetrated by the valve shaft 21. Subsequently, the valve shaft 21 sequentially passes through the mounting hole 23 of the diaphragm 24 and the through hole 30a of the second clamping member 30, and the thread-coupled position of the adjusting nut 38 with respect to the external thread 21d provided on the valve shaft 21 is changed such that the first clamping member 29, the diaphragm 24, and the second clamping member 30 are pushed forward on the valve shaft 21 toward the stepped portion 21b2 provided on the valve shaft 21 against biasing the coil spring 37.

Subsequently, the first clamping member 29 comes into contact with the stepped portion 21b2 such that the displacement of the first clamping member 29 with respect to the valve shaft 21 is restricted, and the second clamping member 30 is pressed forward toward the stepped portion 21b2 by changing the thread-coupled position of the adjusting nut 38 with respect to the external thread 21d such that the bead portion 26 of the diaphragm 24 is compressed by the first clamping member 29 and the second clamping member 30. Subsequently, the bead portion 26 is compressed, the adjusting nut 38 is fixed at a predetermined thread-coupled position where setting pressure of the shaft seal face pressure of the shaft seal portion 28 may be obtained, and the displacement of the second clamping member 30 with respect to the valve shaft 21 is restricted by the adjusting nut 38. Further, the valve body 22 is mounted on the valve shaft 21.

In this way, the diaphragm 24, the first and second clamping members 29 and 30, which constitute the compression mechanism part 27, the coil spring 37, and the valve body 22 are mounted on the valve shaft 21 of the air pressure regulating valve 10 such that the shaft seal face pressure of the shaft seal portion 28 may be set to predetermined setting pressure.

Fifth Exemplary Embodiment

Figure 8:
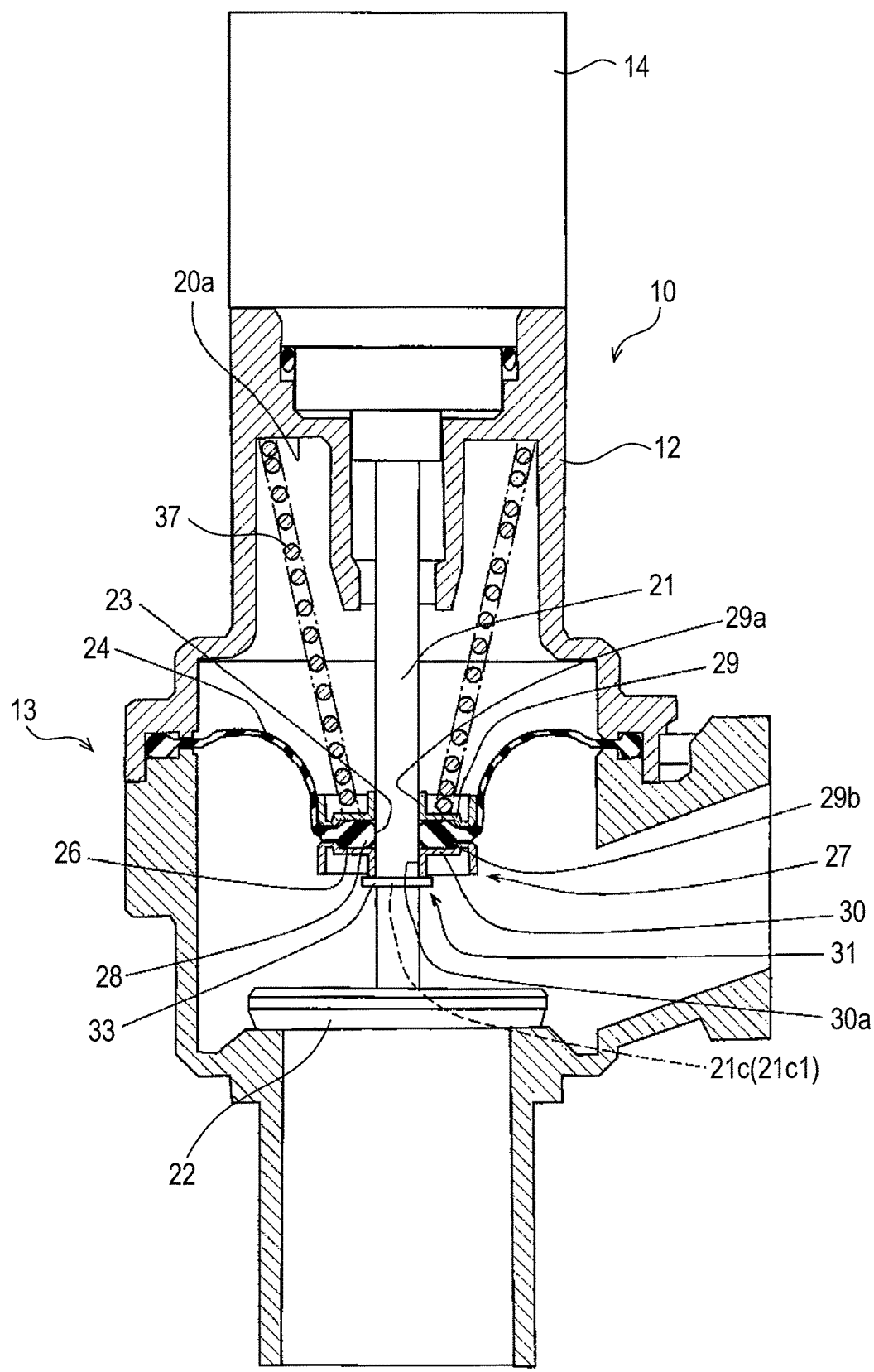
FIG. 8 is a partial cross-sectional view illustrating an air pressure regulating valve according to a fifth exemplary embodiment disclosed here in the closed state.

Next, a fifth exemplary embodiment of the air pressure regulating valve 10 will be described. In the air pressure regulating valve 10 of the second exemplary embodiment, as illustrated in FIG. 5, there are provided the ring groove 21b1 which is formed as the positioning portion 21b of the first clamping member 29, and the E-ring 32 which is mounted in the ring groove 21b1. The air pressure regulating valve 10 of the fifth exemplary embodiment differs from the air pressure regulating valve 10 of the second exemplary embodiment only in that instead of the ring groove 21b1 of the second exemplary embodiment, the coil spring 37 is interposed between the valve cover 12 and the first clamping member 29 which is displaceable in the axial direction with respect to the valve shaft 21, as illustrated in FIG. 8, such that the positioning portion 21b of the first clamping member 29 is configured by a load applied to the first clamping member 29 by the coil spring 37.

Therefore, the load of the coil spring 37 serves not only as the positioning portion 21b of the first clamping member 29, but also as a locking member which restricts the axial movement of the first clamping member 29 with respect to the valve shaft 21, that is, locks the first clamping member 29 on the valve shaft 21.

The first clamping member 29 of the air pressure regulating valve 10 of the fifth exemplary embodiment receives the load of the coil spring 37, and compresses the bead portion 26 of the diaphragm 24 by a predetermined relative distance between the first clamping member 29 and the second clamping member 30. In the air pressure regulating valve 10 of the fifth exemplary embodiment, regarding the shaft seal face pressure of the shaft seal portion 28, the shaft seal face pressure of the shaft seal portion 28 may be set to setting pressure by a predetermined relative distance between the first clamping member 29 and the second clamping member 30 in accordance with the load of the coil spring 37. Therefore, the ring groove 21b1 of the valve shaft 21 and the E-ring 32 may be removed from the air pressure regulating valve 10 of the third exemplary embodiment, and as a result, the number of components is reduced in comparison with the air pressure regulating valve 10 of the second exemplary embodiment.

Next, the mounting of the diaphragm 24, the first and second clamping members 29 and 30, which constitute the compression mechanism part 27, the coil spring 37, and the valve body 22 to the valve shaft 21 of the air pressure regulating valve 10 according to the fifth exemplary embodiment will be described with reference to FIG. 8.

The other end of the coil spring 37, the one end of which is locked on the stepped portion 20a of the valve cover 12 is locked at a back side of the compressing portion 29b of the first clamping member 29 in which the through hole 29a is penetrated by the valve shaft 21. Subsequently, the valve shaft 21 sequentially passes through the mounting hole 23 of the diaphragm 24 and the through hole 30a of the second clamping member 30, and the first clamping member 29, the diaphragm 24, and the second clamping member 30 are pushed forward on the valve shaft 21 toward the ring groove 21c1 provided on the valve shaft 21 against the biasing of the coil spring 37.

The second clamping member 30 is pushed forward toward the ring groove 21c1 such that the bead portion 26 of the diaphragm 24 is compressed by the first clamping member 29 and the second clamping member 30. Subsequently, in a state in which the bead portion 26 is compressed and the second clamping member 30 passes over the ring groove 21c1 provided on the valve shaft 21, the E-ring 33 is mounted in the ring groove 21c1 such that the displacement of the second clamping member 30 with respect to the valve shaft 21 is restricted by the E-ring 33. Further, the valve body 22 is mounted on the valve shaft 21.

As such, the diaphragm 24, the first and second clamping members 29 and 30, which constitute the compression mechanism part 27, the coil spring 37, and the valve body 22 are mounted on the valve shaft 21 of the air pressure regulating valve 10 such that the shaft seal face pressure of the shaft seal portion 28 may be set to predetermined setting pressure.

Figure 9:
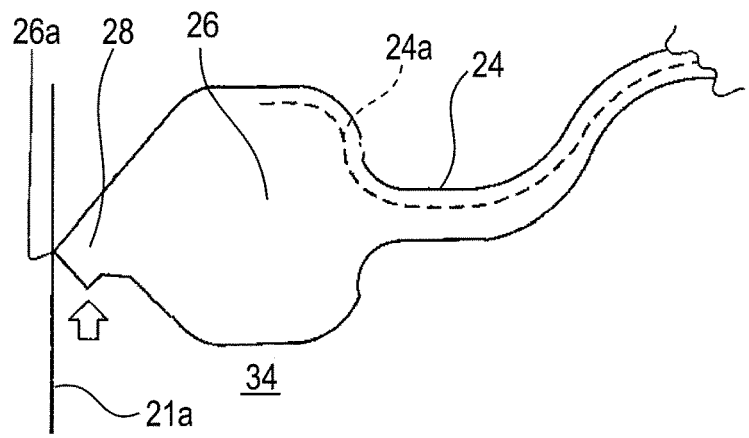
FIG. 9 is a cross-sectional view for explaining a second exemplary embodiment of the bead portion of the diaphragm.

Next, a second exemplary embodiment of the bead portion 26 of the diaphragm 24 in the air pressure regulating valve 10 will be described. In the first exemplary embodiment of the bead portion 26, as illustrated in FIGS. 3 and 4, the cross-sectional shape of the shaft seal portion 28 of the bead portion 26 is an arc shape. Instead, the cross-sectional shape of the shaft seal portion 28 of the bead portion 26 of the second exemplary embodiment differs from that of the bead portion 26 of the first exemplary embodiment only in that in order to improve sealing properties in a case (indicated by a white arrow in FIG. 9) in which positive pressure (pressure higher than atmospheric pressure) acts in the fluid chamber 34, as illustrated in FIG. 9, the cross-sectional shape of the shaft seal portion 28 of the bead portion 26 is formed in a wedge shape in which the inner circumferential surface 26a of the bead portion 26 is more strongly pressed upward against the outer circumferential surface 21a of the valve shaft 21 by the positive pressure in the fluid chamber 34.

Figure 10:
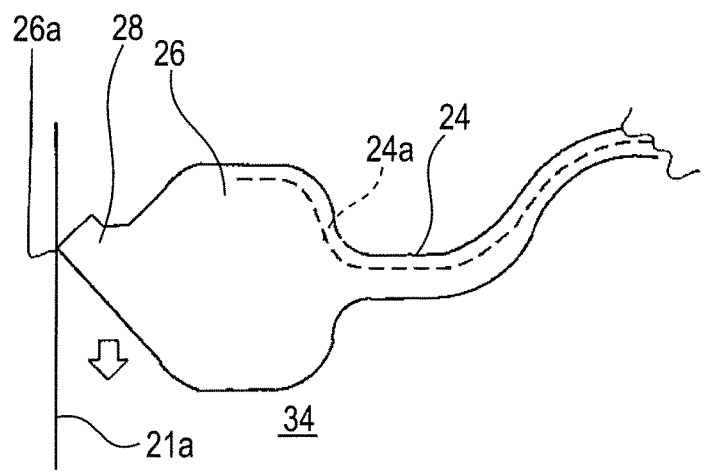
FIG. 10 is a cross-sectional view for explaining a third exemplary embodiment of the bead portion of the diaphragm.

Next, a third exemplary embodiment of the bead portion 26 of the diaphragm 24 in the air pressure regulating valve 10 will be described. As illustrated in FIG. 9, the cross-sectional shape of the shaft seal portion 28 of the bead portion 26 of the second exemplary embodiment is formed in a wedge shape in which the inner circumferential surface 26a of the bead portion 26 is more strongly pressed upward against the outer circumferential surface 21a of the valve shaft 21 by the positive pressure in the fluid chamber 34. Instead, the cross-sectional shape of the shaft seal portion 28 of the bead portion 26 of the third exemplary embodiment differs from that of the bead portion 26 of the second exemplary embodiment only in that in order to improve sealing properties in a case (indicated by a white arrow in FIG. 10) in which negative pressure (pressure lower than atmospheric pressure) acts in the fluid chamber 34, as illustrated in FIG. 10, the cross-sectional shape of the shaft seal portion 28 of the bead portion 26 is formed in a wedge shape in which the inner circumferential surface 26a of the bead portion 26 is more strongly pressed downward against the outer circumferential surface 21a of the valve shaft 21 by the negative pressure in the fluid chamber 34.

Figure 11:
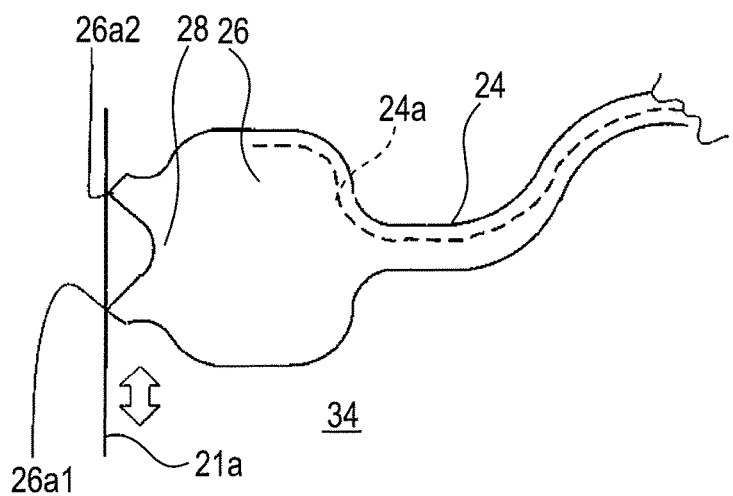
FIG. 11 is a cross-sectional view for explaining a fourth exemplary embodiment of the bead portion of the diaphragm.

Next, a fourth exemplary embodiment of the bead portion 26 of the diaphragm 24 in the air pressure regulating valve 10 will be described. As illustrated in FIG. 10, the cross-sectional shape of the shaft seal portion 28 of the bead portion 26 of the third exemplary embodiment is formed in a wedge shape in which the inner circumferential surface 26a of the bead portion 26 is more strongly pressed downward against the outer circumferential surface 21a of the valve shaft 21 by the negative pressure in the fluid chamber 34. Instead, the cross-sectional shape of the shaft seal portion 28 of the bead portion 26 of the fourth exemplary embodiment differs from that of the bead portion 26 of the third exemplary embodiment only in that in order to improve seal properties in a case (indicated by a white arrow in FIG. 11) in which both of negative pressure and positive pressure act in the fluid chamber 34, as illustrated in FIG. 11, the cross-sectional shape of the shaft seal portion 28 of the bead portion 26 has a first portion 26a1 which is formed in a wedge shape in which the inner circumferential surface 26a of the bead portion 26 is more strongly pressed downward against the outer circumferential surface 21a of the valve shaft 21 by the negative pressure in the fluid chamber 34, and a second portion 26a2 which formed in a wedge shape in which the inner circumferential surface 26a of the bead portion 26 is more strongly pressed upward against the outer circumferential surface 21a of the valve shaft 21 by the positive pressure in the fluid chamber 34.

Figure 12:
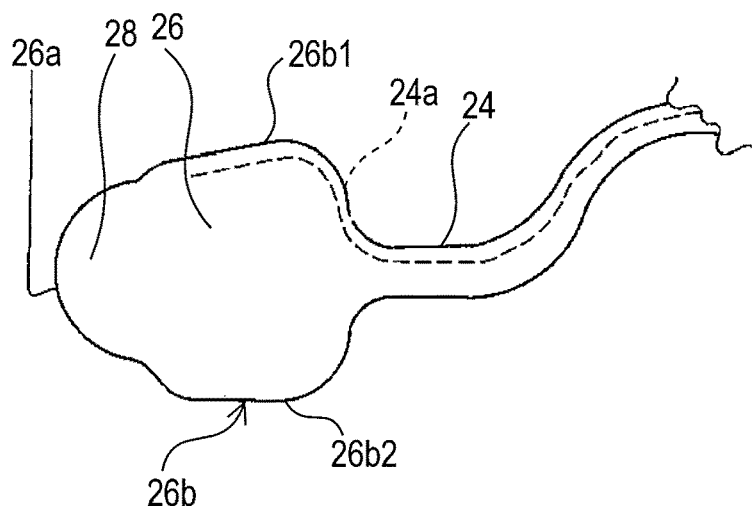
FIG. 12 is a cross-sectional view for explaining a fifth exemplary embodiment of the bead portion of the diaphragm.

Next, a fifth exemplary embodiment of the bead portion 26 of the diaphragm 24 in the air pressure regulating valve 10 will be described. As illustrated in FIGS. 3 and 4, the cross-sectional shape of the compressed portion 26b of the bead portion 26 of the first exemplary embodiment is formed such that the first surface 26b1 and the second surface 26b2 are in parallel with the horizontal direction, that is, the radial direction of the diaphragm 24 (left and right direction in FIG. 3). The bead portion 26 of the fifth exemplary embodiment differs from that of the first exemplary embodiment only in that one or both of the first surface 26b1 and the second surface 26b2 of the compressed portion 26b is or are formed as an inclined surface, for example, as illustrated in FIG. 12, as an inclined surface which is raised in a direction in which the first surface 26b1 is separated from the shaft seal portion 28, that is, in an outer circumferential direction of the diaphragm 24 (right direction in FIG. 12) so that the elastic deformation of the bead portion 26, which is required to generate setting pressure of the shaft seal face pressure of the shaft seal portion 28, is obtained by inhibiting a compressive load with respect to the bead portion 26 by the compression mechanism part 27.

The inclined surface formed on one or both of the first surface 26b1 and the second surface 26b2 of the compressed portion 26b is not limited to the inclined surface which is raised in the outer circumferential direction of the diaphragm 24 (right direction in FIG. 12), but may be formed as an inclined surface which is lowered in the outer circumferential direction of the diaphragm 24 (right direction in FIG. 12), or a combination of the raised inclined surface and the lowered inclined surface. In addition, one or both of the first surface 26b1 and the second surface 26b2 of the compressed portion 26b may be formed in an arc shape so that the elastic deformation of the bead portion 26, which is required to generate setting pressure of the shaft seal face pressure of the shaft seal portion 28, is obtained by inhibiting a compressive load with respect to the bead portion 26 by the compression mechanism part 27.

Figure 13:
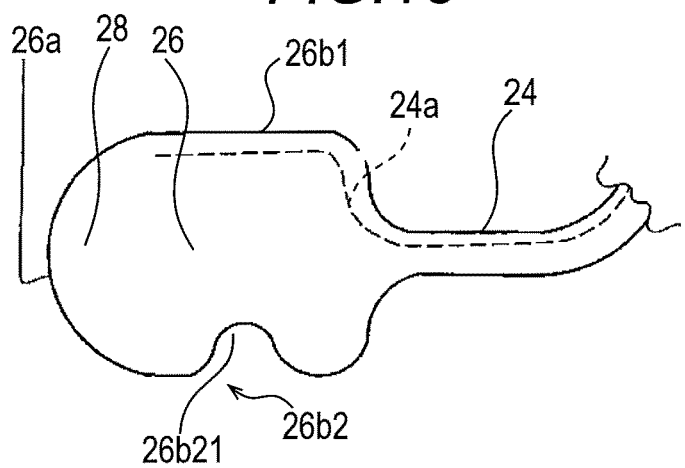
FIG. 13 is a cross-sectional view for explaining a sixth exemplary embodiment of the bead portion of the diaphragm.

Next, a sixth exemplary embodiment of the bead portion 26 of the diaphragm 24 in the air pressure regulating valve 10 will be described. The bead portion 26 of the sixth exemplary embodiment differs from that of the first exemplary embodiment only in that a notch 26b21 is formed in any one of the first surface 26b1 and the second surface 26b2 of the compressed portion 26b, for example, as illustrated in FIG. 13, the notch 26b21 is formed in the second surface 26b2 so that the elastic deformation of the bead portion 26, which is required to generate setting pressure of the shaft seal face pressure of the shaft seal portion 28, is obtained by inhibiting a compressive load with respect to the bead portion 26 by the compression mechanism part 27, like the fifth exemplary embodiment.

Figure 14:
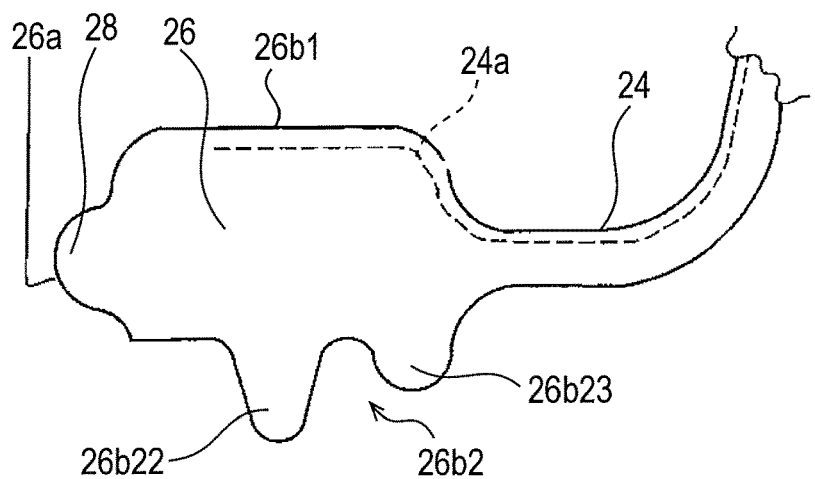
FIG. 14 is a cross-sectional view for explaining a seventh exemplary embodiment of the bead portion of the diaphragm.

Next, a seventh exemplary embodiment of the bead portion 26 of the diaphragm 24 in the air pressure regulating valve 10 will be described. The bead portion 26 of the seventh exemplary embodiment differs from that of the sixth exemplary embodiment only in that plural projections 26b22 and 26b23 is formed in any one of the first surface 26b1 and the second surface 26b2 of the compressed portion 26b, for example, as illustrated in FIG. 14, the plural projections 26b22 and 26b23 is formed in the second surface 26b2 so that the elastic deformation of the bead portion 26, which is required to generate setting pressure of the shaft seal face pressure of the shaft seal portion 28, is obtained by inhibiting a compressive load with respect to the bead portion 26 by the compression mechanism part 27, like the sixth exemplary embodiment.

Figure 15:
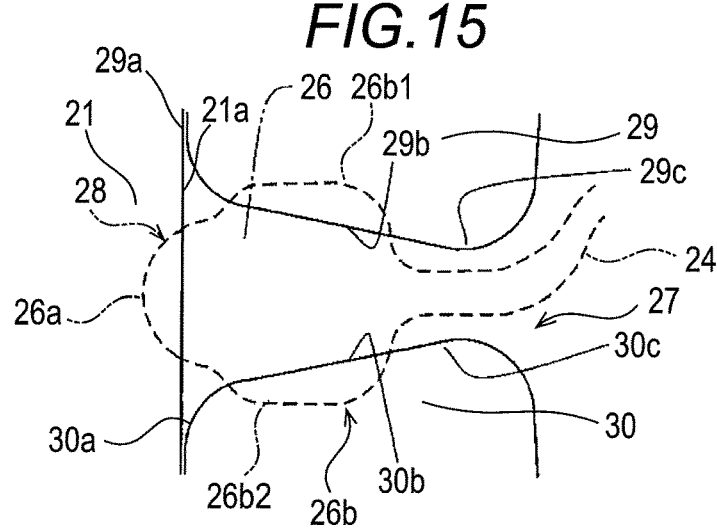
FIG. 15 is a cross-sectional view for explaining a second exemplary embodiment of the compression mechanism part.

Next, a second exemplary embodiment of the compression mechanism part 27 of the air pressure regulating valve 10 will be described. As illustrated in FIG. 3, the compression mechanism part 27 of the first exemplary embodiment is constituted by the first clamping member 29 and the second clamping member 30, the first clamping member 29 and the second clamping member 30 have the compressing portions 29b and 30b which are formed in parallel with the horizontal direction, that is, the radial direction of the diaphragm 24 (left and right direction in FIG. 3), and the first clamping member 29 and the second clamping member 30 have the disengagement preventing portions 29c and 30c which are provided in a convex shape at an outer diameter side from the compressing portions 29b and 30b. Instead, as illustrated in FIG. 15, the compression mechanism part 27 of the second exemplary embodiment differs from that of the first exemplary embodiment only in that the compressing portion 29b and the disengagement preventing portion 29c of the first clamping member 29 and the compressing portion 30b and the disengagement preventing portion 30c of the second clamping member 30 are formed as a continuous tapered surface so that a relative distance is decreased in the radial direction of the diaphragm 24 (right direction in FIG. 20). Therefore, the elastic deformation of the bead portion 26, which is required to generate setting pressure of the shaft seal face pressure of the shaft seal portion 28, may be obtained by inhibiting a compressive load with respect to the bead portion 26 by the compression mechanism part 27.

Figure 16:
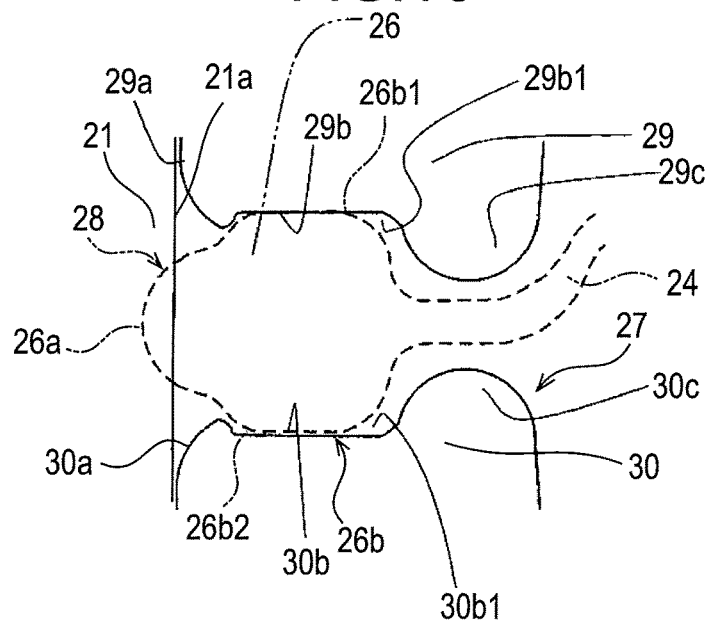
FIG. 16 is a cross-sectional view for explaining a third exemplary embodiment of the compression mechanism part.

Next, a third exemplary embodiment of the compression mechanism part 27 of the air pressure regulating valve 10 will be described. As illustrated in FIG. 3, the compression mechanism part 27 of the first exemplary embodiment is constituted by the first clamping member 29 and the second clamping member 30, and the first clamping member 29 and the second clamping member 30 have the compressing portions 29b and 30b which are formed in parallel with the horizontal direction, that is, the radial direction of the diaphragm 24 (left and right direction in FIG. 3). Instead, the compression mechanism part 27 of the third exemplary embodiment differs from that of the first exemplary embodiment only in that as illustrated in FIG. 16, a groove 29b1 into which the compressed portion 26b of the bead portion 26 is fitted is provided in the compressing portion 29b of the first clamping member 29, and a groove 30b1 into which the compressed portion 26b of the bead portion 26 is fitted is provided in the compressing portion 30b of the second clamping member 30. Therefore, with the grooves 29b1 and 30b1, it is possible to regulate a magnitude of the elastic deformation of the bead portion 26 which is required to generate setting pressure of the shaft seal face pressure of the shaft seal portion 28.

Figure 17:
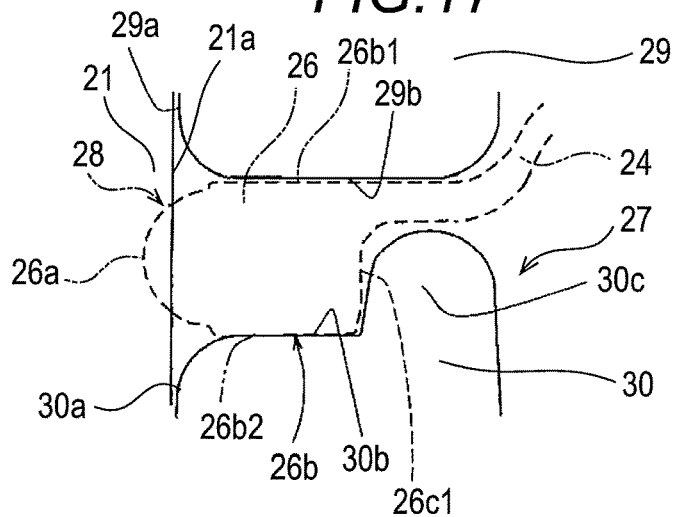
FIG. 17 is a cross-sectional view for explaining a fourth exemplary embodiment of the compression mechanism part.

Next, a fourth exemplary embodiment of the compression mechanism part 27 of the air pressure regulating valve 10 will be described. As illustrated in FIG. 3, the compression mechanism part 27 of the first exemplary embodiment is constituted by the first clamping member 29 and the second clamping member 30, and the first clamping member 29 and the second clamping member 30 have the disengagement preventing portions 29c and 30c provided in a convex shape. Instead, as illustrated in FIG. 17, the compression mechanism part 27 of the fourth exemplary embodiment differs from that of the first exemplary embodiment only in that the disengagement preventing portion 29c of the first clamping member 29 is removed. In the compression mechanism part 27 of the fourth exemplary embodiment, with the disengagement preventing portion 30c of the second clamping member 30, the bead portion 26 of the diaphragm 24 is prevented from being disengaged from the compression mechanism part 27. As a result, preferably, as illustrated in FIG. 17, in a case in which the shape of the bead portion 26 of the diaphragm 24 is changed to a shape having a shoulder portion 26c1 locked on the disengagement preventing portion 30c, it is possible to more effectively prevent disengagement of the bead portion 26.

Figure 18:
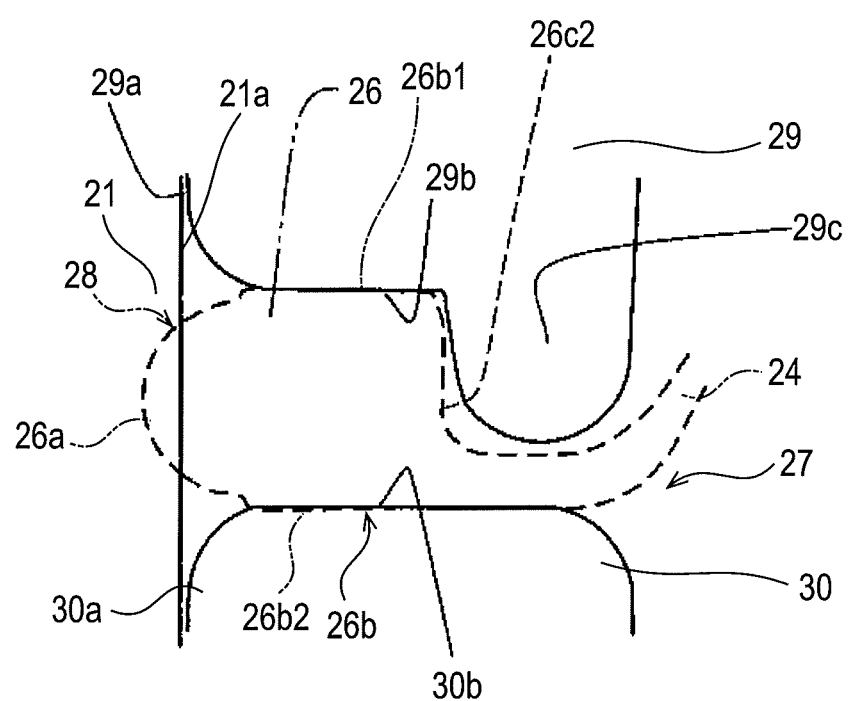
FIG. 18 is a cross-sectional view for explaining a fifth exemplary embodiment of the compression mechanism part.

Next, a fifth exemplary embodiment of the compression mechanism part 27 of the air pressure regulating valve 10 will be described. As illustrated in FIG. 3, the compression mechanism part 27 of the first exemplary embodiment is constituted by the first clamping member 29 and the second clamping member 30, and the first clamping member 29 and the second clamping member 30 have the disengagement preventing portions 29c and 30c provided in a convex shape. Instead, as illustrated in FIG. 18, the compression mechanism part 27 of the fifth exemplary embodiment differs from that of the first exemplary embodiment only in that the disengagement preventing portion 30c of the second clamping member 30 is removed. In the compression mechanism part 27 of the fifth exemplary embodiment, with the disengagement preventing portion 29c of the first clamping member 29, the bead portion 26 of the diaphragm 24 is prevented from being disengaged from the compression mechanism part 27. As a result, preferably, as illustrated in FIG. 18, in a case in which the shape of the bead portion 26 of the diaphragm 24 is changed to a shape having a shoulder portion 26c2 locked on the disengagement preventing portion 30c, it is possible to more effectively prevent disengagement of the bead portion 26.

As described above, the fluid control valve 10 according to the first to fifth exemplary embodiments disclosed here includes: the valve housing 13 including the flow path FP formed therein and having the inflow port 15 and the outflow port 16 for a fluid; the valve seat 17 formed in the flow path FP; the driving device 14 which is mounted in the valve housing 13; the valve shaft 21 configured to be moved by being driven by the driving device 14; the valve body 22 mounted on the valve shaft 21 so as to open or close the flow path FP by being separated from or brought into contact with the valve seat 17; and the diaphragm 24 formed in a form of an annular thin film and including the outer circumferential portion 25 that is sealably fixed to the valve housing 13 and the inner circumferential portion 26 that is mounted on the valve shaft 21, the diaphragm 24 being configured to move together with the valve shaft 21 in a state in which one side of the diaphragm faces the fluid chamber 34 that is configured to include the flow path FP and the valve seat 17 and allows a fluid to flow therein, and the other side of the diaphragm faces the atmosphere chamber 35 that is opened to the atmosphere, in which the inner circumferential portion 26 of the diaphragm 24 has the compressed portion 26b, and the shaft seal portion 28 which may press the inner circumferential surface 26a of the inner circumferential portion 26 of the diaphragm 24 against the outer circumferential surface 21a of the valve shaft 21, and the fluid control valve 10 further includes the compression mechanism part 27 which compresses the compressed portion 26b of the diaphragm 24 so as to generate shaft seal face pressure of the shaft seal portion 28. Therefore, since the fluid control valve 10 includes: the diaphragm 24 including the outer circumferential portion 25 sealably fixed to the valve housing 13 and the inner circumferential portion 26 mounted on the valve shaft 21 and configured to move together with the valve shaft 21; the shaft seal portion 28 that is capable of pressing the inner circumferential surface 26a of the inner circumferential portion 26 of the diaphragm 24 against the outer circumferential surface 21a of the valve shaft 21; and the compression mechanism part 27 configured to generate shaft seal face pressure at the shaft seal portion 28 by compressing the compressed portion 26b of the diaphragm 24, the inner circumferential surface 26a of the diaphragm 24 can be formed directly on the shaft seal portion 28 that is pressed against the outer circumferential surface 21a of the valve shaft 21, and as a result the inner diameter of the diaphragm 24 can be reduced so that the dimension of an outer diameter of the fluid control valve 10 can be reduced. With the shaft seal portion 28 of the diaphragm 24, it is possible to prevent a fluid, which flows in the fluid chamber 34 in the fluid control valve 10, and moisture, a foreign matter, or the like, which has infiltrated into the fluid chamber 34, from infiltrating into the atmosphere chamber 35, without installing a dedicated seal member.

As described above, according to the fluid control valve 10 according to the first to fifth exemplary embodiments disclosed here, the diaphragm 24 includes an elastic material and the reinforcing base fabric material 24a, and the base fabric material 24a extends to the compressed portion 26b in the inner circumferential direction of the diaphragm 24. Therefore, the diaphragm 24 is reinforced by the base fabric material 24a, and the base fabric material 24a does not extend to the shaft seal portion 28, thereby preventing deterioration of the sealing function of the diaphragm 24.

As described above, according to the fluid control valve 10 according to the first and fifth exemplary embodiments disclosed here, the compression mechanism part 27 includes a pair of clamping members 29 and 30 which is provided at the opposite sides in the thickness direction of the diaphragm 24 and clamps the inner circumferential portion 26 of the diaphragm 24, and has the shaft seal face pressure setting part 31 which may set shaft seal face pressure applied to the clamping members 29 and 30 to predetermined setting pressure. Therefore, it is possible to obtain setting pressure of the shaft seal face pressure of the shaft seal portion 28.

As described above, according to the fluid control valve 10 according to the first to fifth exemplary embodiments disclosed here, the shaft seal face pressure setting part 31 is the setting mechanism that sets a distance between the clamping members 29 and 30, and has a pair of positioning portions 21b and 21c provided at the opposite sides of the valve shaft 21 in the thickness direction of the diaphragm 24. Therefore, the setting pressure of the shaft seal face pressure of the shaft seal portion 28 may be obtained by the pair of positioning portions 21b and 21c provided on the valve shaft 21.

As described above, according to the fluid control valve 10 according to the first to fifth exemplary embodiments disclosed here, the clamping members 29 and 30 are locked on the valve shaft 21 by the locking members 32, 33, 37, and 38 mounted on at least one of the pair of positioning portions 21b and 21c. Therefore, it is possible to maintain setting pressure of the shaft seal face pressure of the shaft seal portion 28.

As described above, according to the fluid control valve 10 according to the first to fifth exemplary embodiments disclosed here, at least one of the clamping members 29 and 30 is provided with the compressing portion 29b or 30b which compresses the inner circumferential portion 26 of the diaphragm 24 in the axial direction, and the disengagement preventing portion 29c or 30c which is provided at the outer side in the radial direction from the compressing portion 29b or 30b and prevents disengagement of the inner circumferential portion 26. Therefore, it is possible to prevent the inner circumferential portion 26 of the diaphragm 24 from being disengaged from the clamping members 29 and 30.

The above-described effects can be achieved by the following configurations of the diaphragm.

That is, the flange-shaped bead portion 26, which expands inward, may be formed over the entire circumferential portion of the diaphragm 24.

In addition, the cross-sectional shape of the shaft seal portion 28 may have at least one circular arc shape. The bead portion 26 may be formed such that a cross-sectional shape of the bead portion 26 has a flat shape in which a length of the bead portion 26 in the horizontal direction of the diaphragm 24 is longer than a length of the bead portion 26 in the thickness direction of the diaphragm 24.

Further, the first clamping member 29 and the second clamping member 30 may include the compressing portions 29b and 30b, respectively, and the compressing portions 29b and 30b may be formed in parallel with the radial direction of the diaphragm 24 to compress the diaphragm 24.

It is apparent that in a case in which a plurality of exemplary embodiments are present, characterized portions of the respective exemplary embodiments may be appropriately combined unless particularly stated otherwise.

With the fluid control valve according to the embodiment disclosed here, since the fluid control valve includes: a diaphragm which includes an outer circumferential portion sealably fixed to the valve housing and an inner circumferential portion mounted on the valve shaft, and configured to move together with the valve shaft; a shaft seal portion that is capable of pressing the inner circumferential surface of the inner circumferential portion of the diaphragm against the outer circumferential surface of the valve shaft; and a compression mechanism part configured to generate shaft seal face pressure at the shaft seal portion by compressing the compressed portion of the diaphragm, the inner circumferential surface of the diaphragm can be formed directly on the shaft seal portion that is pressed against the outer circumferential surface of the valve shaft, and as a result the inner diameter of the diaphragm can be reduced so that the dimension of the outer diameter of the fluid control valve can be reduced. With the shaft seal portion of the diaphragm, it is possible to prevent a fluid, which flows in the fluid chamber in the fluid control valve, and moisture, a foreign matter, or the like, which has infiltrated into the fluid chamber, from infiltrating into the atmosphere chamber, without installing a dedicated seal member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A fluid control valve comprising:
   a valve housing including a flow path formed therein and having an inflow port and an outflow port for a fluid;
   a valve seat formed in the flow path;
   a driving device mounted in the valve housing;
   a valve shaft configured to be moved by being driven by the driving device;
   a valve body which is mounted on the valve shaft so as to open or close the flow path by being separated from or brought into contact with the valve seat; and
   a diaphragm formed in a form of an annular thin film and including an outer circumferential portion that is sealably fixed to the valve housing and an inner circumferential portion that is mounted on the valve shaft, the diaphragm being configured to move together with the valve shaft in a state where one side of the diaphragm faces a fluid chamber that is configured to include the flow path and the valve seat so as to allow the fluid to flow therethrough, and the other side of the diaphragm faces an atmosphere chamber, wherein the inner circumferential portion of the diaphragm includes a compressed portion, and a shaft seal portion configured to protrude toward the valve shaft and press an inner circumferential surface of the inner circumferential portion of the diaphragm against an outer circumferential surface of the valve shaft, and the fluid control valve further includes a compression mechanism part configured to generate shaft seal face pressure at the shaft seal portion by compressing the compressed portion of the diaphragm, wherein the diaphragm includes an elastic material and a reinforcing base fabric material, and the base fabric material extends to the compressed portion in an inner circumferential direction of the diaphragm, and wherein a portion of the diaphragm which faces the atmosphere chamber includes the base fabric material, wherein the copression mechanism part includes a pair of clamping members provided at opposite sides in a thickness direction of the diaphragm and clamping the inner circumferential portion of the diaphragm, and wherein the clamping members are locked on the valve shaft by a locking member mounted on at least one of the pair of positioning portions.

2. The fluid control valve according to claim 1, wherein the compression mechanism part has a shaft seal face pressure setting part which is capable of setting the shaft seal face pressure applied to the clamping members to predetermined setting pressure.

3. The fluid control valve according to claim 2, wherein the shaft seal face pressure setting part is a setting mechanism that sets a distance between the clamping members, and has a pair of positioning portions provided at opposite sides of the valve shaft in the thickness direction of the diaphragm.

4. The fluid control valve according to claim 2, wherein at least one of the clamping members has a compressing portion which compresses the inner circumferential portion of the diaphragm in the axial direction, and a disengagement preventing portion which is provided at an outer side in a radial direction from the compressing portion and prevents disengagement of the inner circumferential portion.

5. The fluid control valve according to claim 2, wherein the clamping members include a first clamping member and a second clamping member, and compressing portions of the first clamping member and the second clamping member are formed in parallel with the radial direction of the diaphragm to compress the diaphragm.

6. The fluid control valve according to claim 1, further comprising:
a flange-shaped bead portion, which expands inward, is formed all around the inner circumferential portion of the diaphragm.

7. The fluid control valve according to claim 6, wherein the bead portion is formed such that a cross-sectional shape of the bead portion has a flat shape in which a length of the bead portion in a horizontal direction of the diaphragm is longer than a length in a thickness direction of the diaphragm.

8. The fluid control valve according to claim 1, wherein a cross-sectional shape of the shaft seal portion has at least one circular arc shape.

9. A fluid control valve comprising:
a valve housing including a flow path formed therein and having an inflow port and an outflow port for a fluid;
a valve seat formed in the flow path;
a driving device mounted in the valve housing;
a valve shaft configured to be moved by being driven by the driving device;
a valve body which is mounted on the valve shaft so as to open or close the flow path by being separated from or brought into contact with the valve seat; and
a diaphragm formed in a form of an annular thin film and including an outer circumferential portion that is sealably fixed to the valve housing and an inner circumferential portion that is mounted on the valve shaft, the diaphragm being configured to move together with the valve shaft in a state where one side of the diaphragm faces a fluid chamber that is configured to include the flow path and the valve seat so as to allow the fluid to flow therethrough, and the other side of the diaphragm faces an atmosphere chamber, wherein the inner circumferential portion of the diaphragm includes a compressed portion, and a shaft seal portion configured to protrude toward the valve shaft and press an inner circumferential surface of the inner circumferential portion of the diaphragm against an outer circumferential surface of the valve shaft, and the fluid control valve further includes a compression mechanism part configured to generate shaft seal face pressure at the shaft seal portion by compressing the compressed portion of the diaphragm, and wherein the diaphragm includes an elastic material and a reinforcing base fabric material, and the base fabric material extends to the compressed portion in an inner circumferential direction of the diaphragm so that the base fabric material does not extend to the shaft seal portion of the diaphragm.

10. The fluid control valve according to claim 9, wherein the compression mechanism part includes a pair of clamping members which is provided at opposite sides in a thickness direction of the diaphragm and clamps the inner circumferential portion of the diaphragm, and has a shaft seal face pressure setting part which is capable of setting the shaft seal face pressure applied to the clamping members to predetermined setting pressure.

11. The fluid control valve according to claim 10, wherein the shaft seal face pressure setting part is a setting mechanism that sets a distance between the clamping members, and has a pair of positioning portions provided at opposite sides of the valve shaft in the thickness direction of the diaphragm.

12. The fluid control valve according to claim 11, wherein the clamping members are locked on the valve shaft by a locking member mounted on at least one of the pair of positioning portions.

13. The fluid control valve according to claim 10, wherein at least one of the clamping members has a compressing portion which compresses the inner circumferential portion of the diaphragm in the axial direction, and a disengagement preventing portion which is provided at an outer side in a radial direction from the compressing portion and prevents disengagement of the inner circumferential portion.

14. The fluid control valve according to claim 10, wherein the clamping members include a first clamping member and a second clamping member, and compressing portions of the first clamping member and the second clamping member are formed in parallel with the radial direction of the diaphragm to compress the diaphragm.

15. The fluid control valve according to claim 9, further comprising:
a flange-shaped bead portion, which expands inward, is formed all around the inner circumferential portion of the diaphragm.

16. The fluid control valve according to claim 15, wherein the bead portion is formed such that a cross-sectional shape of the bead portion has a flat shape in which a length of the bead portion in a horizontal direction of the diaphragm is longer than a length in a thickness direction of the diaphragm.

17. The fluid control valve according to claim 9, wherein a cross-sectional shape of the shaft seal portion has at least one circular arc shape.

\* \* \* \* \*